(12) United States Patent
Lim et al.

(10) Patent No.: US 11,943,751 B2
(45) Date of Patent: Mar. 26, 2024

(54) EXTENDED RANGE TRANSMISSION IN WIRELESS LOCAL AREA NETWORK

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 17/450,758

(22) Filed: Oct. 13, 2021

(65) Prior Publication Data

US 2022/0116921 A1    Apr. 14, 2022

(30) Foreign Application Priority Data

Oct. 14, 2020  (KR) .................. 10-2020-0132889

(51) Int. Cl.
*H04W 84/12*  (2009.01)
*H04L 5/00*  (2006.01)
*H04L 27/18*  (2006.01)
*H04W 72/044*  (2023.01)

(52) U.S. Cl.
CPC ......... *H04W 72/044* (2013.01); *H04L 5/0044* (2013.01); *H04L 27/18* (2013.01); *H04W 84/12* (2013.01)

(58) Field of Classification Search
CPC .. H04W 72/044; H04W 84/12; H04L 5/0044; H04L 27/18
See application file for complete search history.

(56) References Cited

U.S. PATENT DOCUMENTS

2018/0302858 A1\* 10/2018 Son ................... H04L 5/0094
2019/0097850 A1\* 3/2019 Kenney ............... H04L 5/0044
2020/0136884 A1\* 4/2020 Park ................... H04L 27/2665
2022/0045889 A1\* 2/2022 Yu ..................... H04W 72/0453
2022/0060941 A1\* 2/2022 Suh ..................... H04L 1/0068

\* cited by examiner

*Primary Examiner* — Kent Krueger
(74) *Attorney, Agent, or Firm* — LEE, HONG, DEGERMAN, KANG & WAIMEY

(57) ABSTRACT

The present specification provides a technical feature for extended range transmission in a wireless LAN signal. A physical protocol data unit (PPDU) of the present specification may include a universal signal (U-SIG) field. The U-SIG field may be received through first to the fourth symbols, the second symbol may include information in which bit information of the first symbol is repeated, and the fourth symbol may include information in which bit information of the third symbol is repeated. The receiving STA of the present specification may determine the transmission mode of the PPDU based on constellation mapping pattern of the first and second symbols.

17 Claims, 25 Drawing Sheets

| Version independent field (1910) | Version dependent field (1920) |
|---|---|

EXTENDED RANGE TRANSMISSION IN WIRELESS LOCAL AREA NETWORK

CROSS-REFERENCE TO RELATED APPLICATION

Pursuant to 35 U.S.C. § 119(a), this application claims the benefit of an earlier filing date and right of priority to Korean Patent Application No. 10-2020-0132889, filed on Oct. 14, 2020, the contents of which is hereby incorporated by reference herein in its entirety.

BACKGROUND

Technical Field

The present specification relates to a wireless local area network (LAN) system, and more specifically, relates to the configuration of a data unit for Extended Range (ER) transmission.

Description of the Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a wide bandwidth (e.g., 160/240/320 MHz) may be used for high throughput. Also, in order to efficiently use the bandwidth, preamble puncturing and multiple RU transmission may be used.

SUMMARY

In a new wireless LAN standard, various technical features are being discussed in order to extend signal transmission. The present specification proposes various technical features for extending a transmission range of a wireless LAN signal.

Technical features of the present specification relate to technical features performed by a station (STA) in a wireless local area network. The PPDU of the present specification may be configured based on one of a plurality of transmission modes including a first mode related to an extended range (ER) preamble and a second mode related to duplicate transmission.

A physical protocol data unit (PPDU) of the present specification may include a legacy signal (L-SIG) field, a Repeated L-SIG (RL-SIG) field in which the L-SIG field is repeated, and a Universal Signal (U-SIG) field contiguous to the RL-SIG field. For example, the U-SIG field may be received through first to fourth symbols. The second symbol may include information in which bit information of the first symbol is repeated, and the fourth symbol may include information in which bit information of the third symbol is repeated.

The receiving STA of the present specification may determine a transmission mode of the PPDU based on a constellation mapping pattern of the first and second symbols. In this case, a constellation mapping pattern for the first mode may have a first mapping pattern, and a constellation mapping pattern for the second mode may have a second mapping pattern.

BRIEF DESCRIPTION OF THE DRAWINGS

FIG. 19 shows an example of a first control signal field or U-SIG field of the present specification.

DESCRIPTION OF EXEMPLARY EMBODIMENTS

Figure 1:
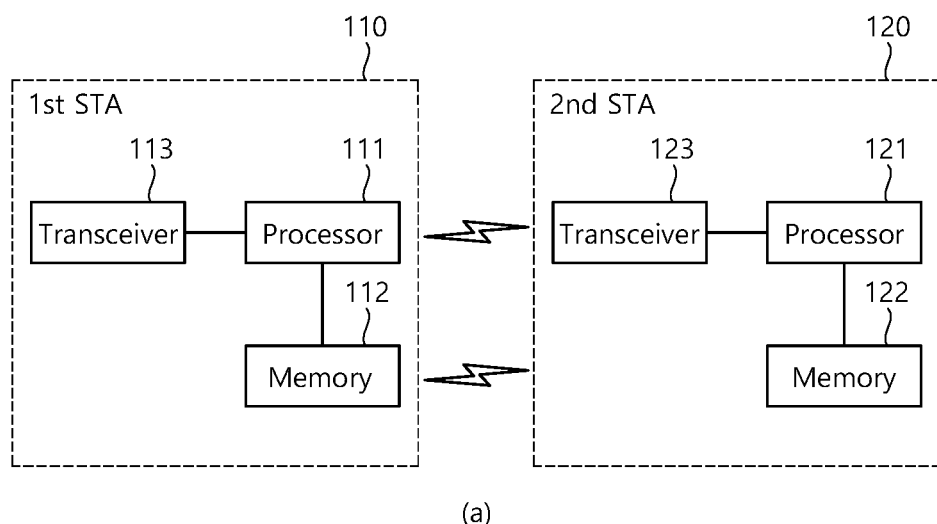
FIG. 1 shows an example of a transmitting apparatus and/or receiving apparatus of the present specification.
Figure 1:
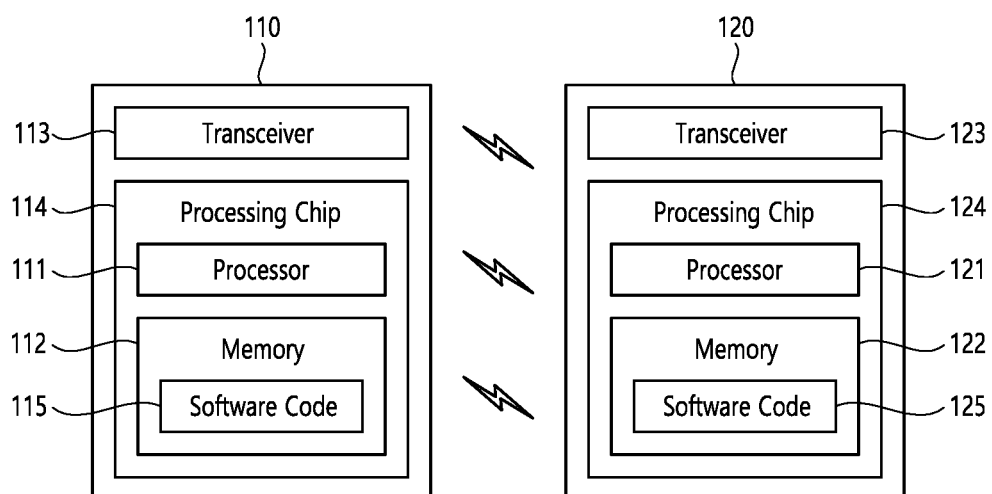

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like. For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
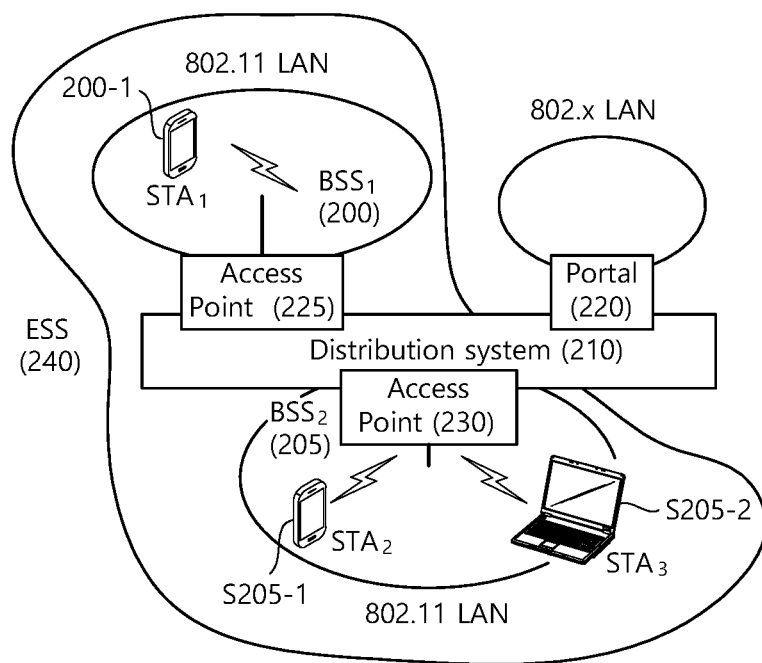
FIG. 2 is a conceptual view illustrating the structure of a wireless local area network (WLAN).
Figure 2:
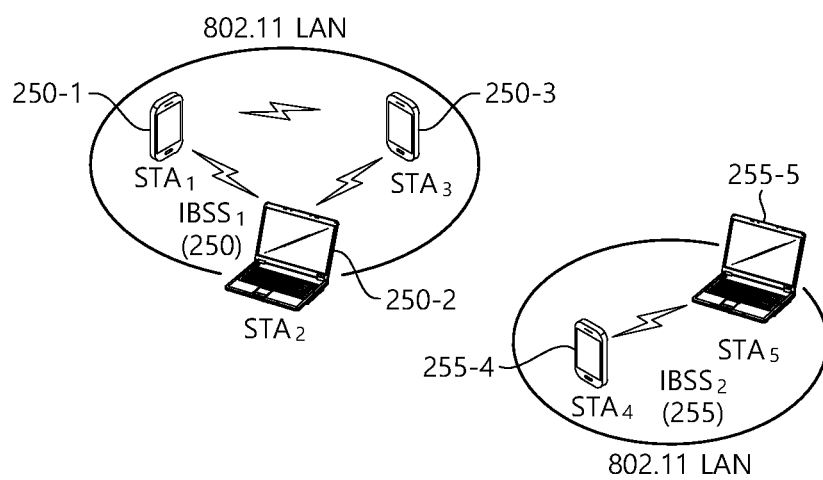

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
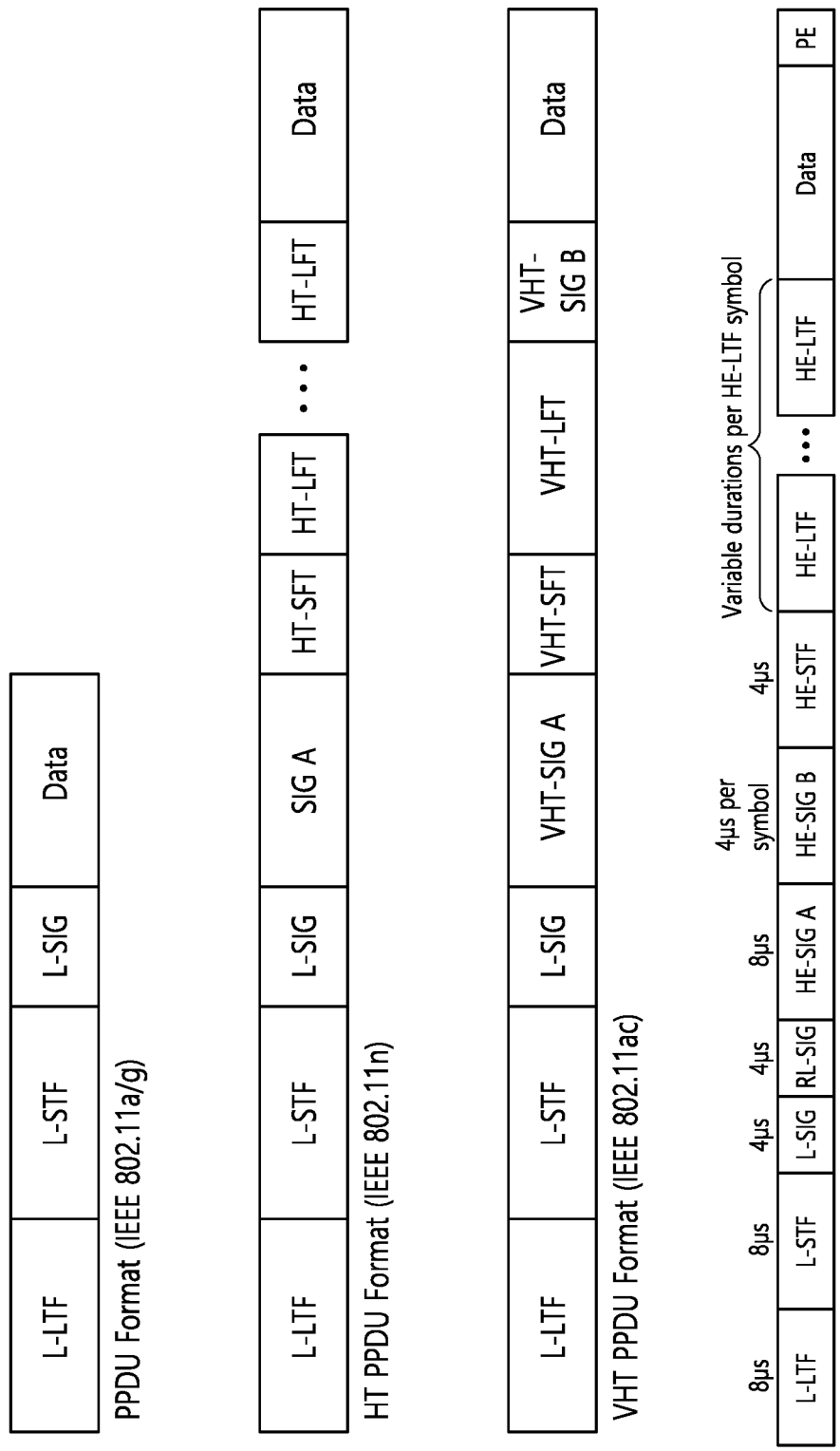
FIG. 3 illustrates an example of a PPDU used in an IEEE standard.

FIG. 3 illustrates an example of a PPDU used in an IEEE standard.

As illustrated in FIG. 3, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
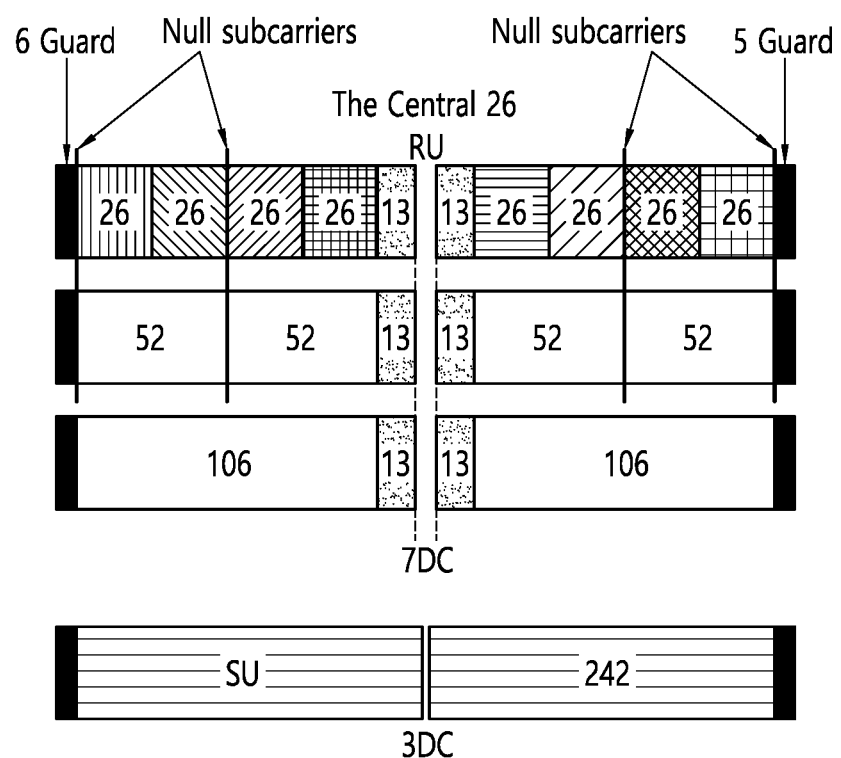
FIG. 4 illustrates a layout of resource units (RUs) used in a band of 20 MHz.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
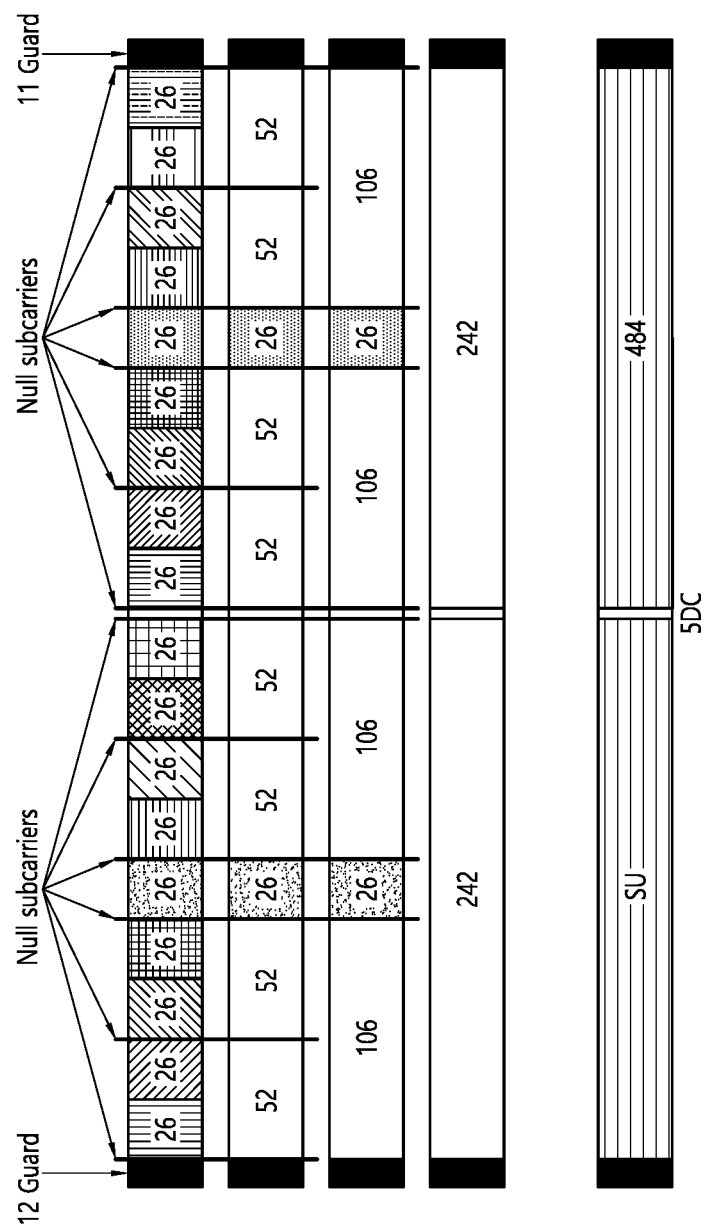
FIG. 5 illustrates a layout of RUs used in a band of 40 MHz.

FIG. 5 illustrates a layout of RUs used in a band of 40 MHz.

Similar to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similar to FIG. 5.

Figure 6:
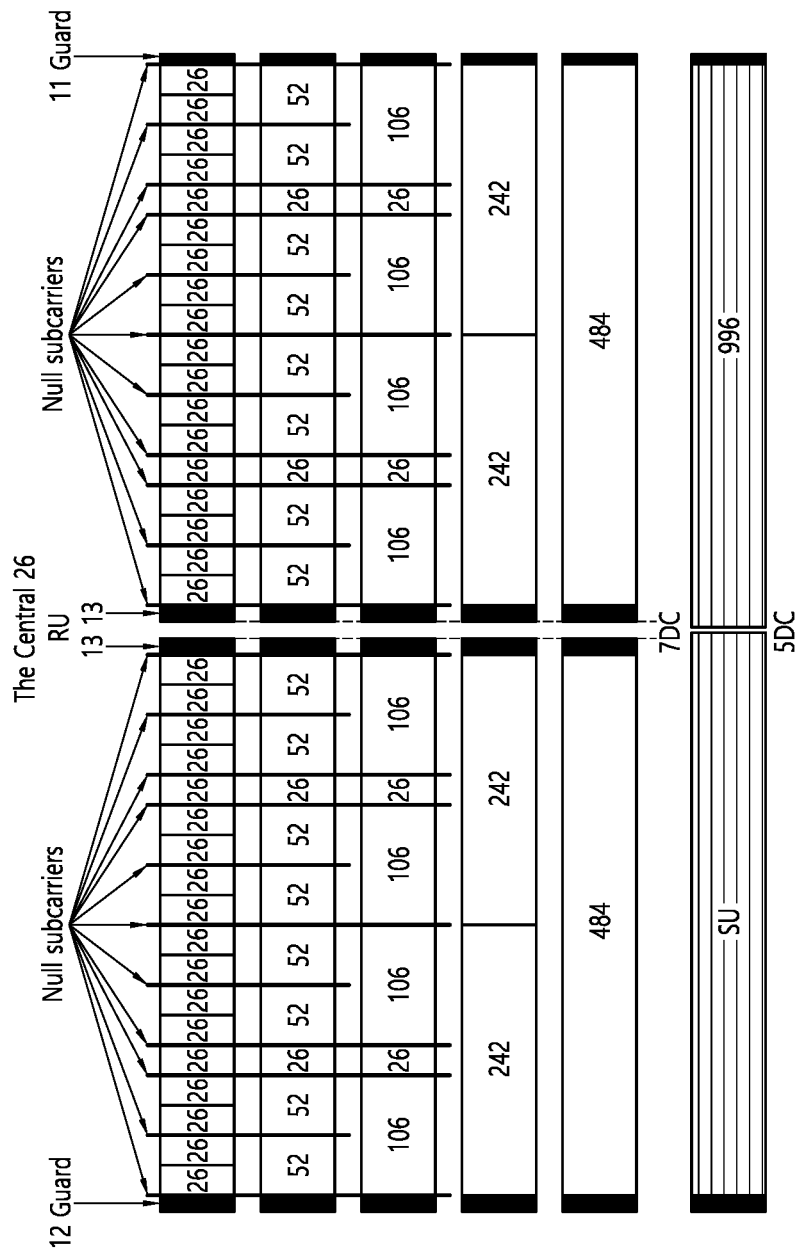
FIG. 6 illustrates a layout of RUs used in a band of 80 MHz.

FIG. 6 illustrates a layout of RUs used in a band of 80 MHz.

Similar to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 7:
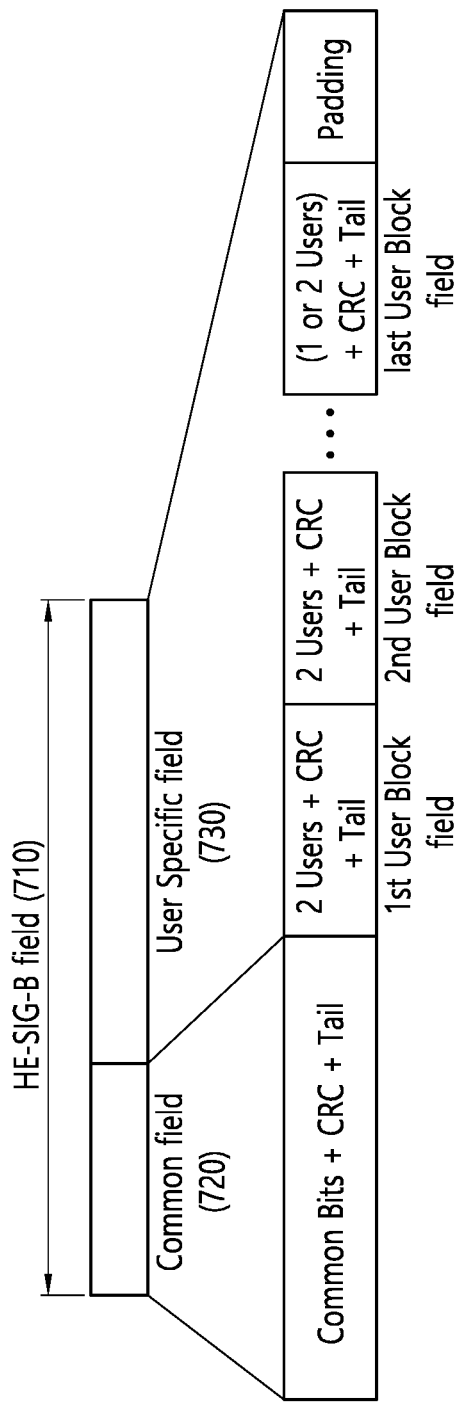
FIG. 7 illustrates a structure of an HE-SIG-B field.

FIG. 7 illustrates a structure of an HE-SIG-B field.

As illustrated, an HE-SIG-B field 710 includes a common field 720 and a user-specific field 730. The common field 720 may include information commonly applied to all users (i.e., user STAs) which receive SIG-B. The user-specific field 730 may be called a user-specific control field. When the SIG-B is transferred to a plurality of users, the user-specific field 730 may be applied only any one of the plurality of users.

As illustrated, the common field 720 and the user-specific field 730 may be separately encoded.

The common field 720 may include RU allocation information of N*8 bits. For example, the RU allocation information may include information related to a location of an RU. For example, when a 20 MHz channel is used as shown in FIG. 4, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 4, up to nine 26-RUs may be allocated to the 20 MHz channel. When the RU allocation information of the common field 720 is set to "00000000" as shown in Table 1, the nine 26-RUs may be allocated to a corresponding channel (i.e., 20 MHz). In addition, when the RU allocation information of the common field 720 is set to "00000001" as shown in Table 1, seven 26-RUs and one 52-RU are arranged in a corresponding channel. That is, in the example of FIG. 4, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000y$_2$y$_1$y$_0$ | 106 | | 26 | 26 | 26 | 26 | 26 | | | 9 |
| 01001y$_2$y$_1$y$_0$ | 106 | | 26 | 26 | 26 | 52 | | | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 7, the user-specific field 730 may include a plurality of user fields. As described above, the number of STAs (e.g., user STAs) allocated to a specific channel may be determined based on the RU allocation information of the common field 720. For example, when the RU allocation information of the common field 720 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 8.

ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 8:
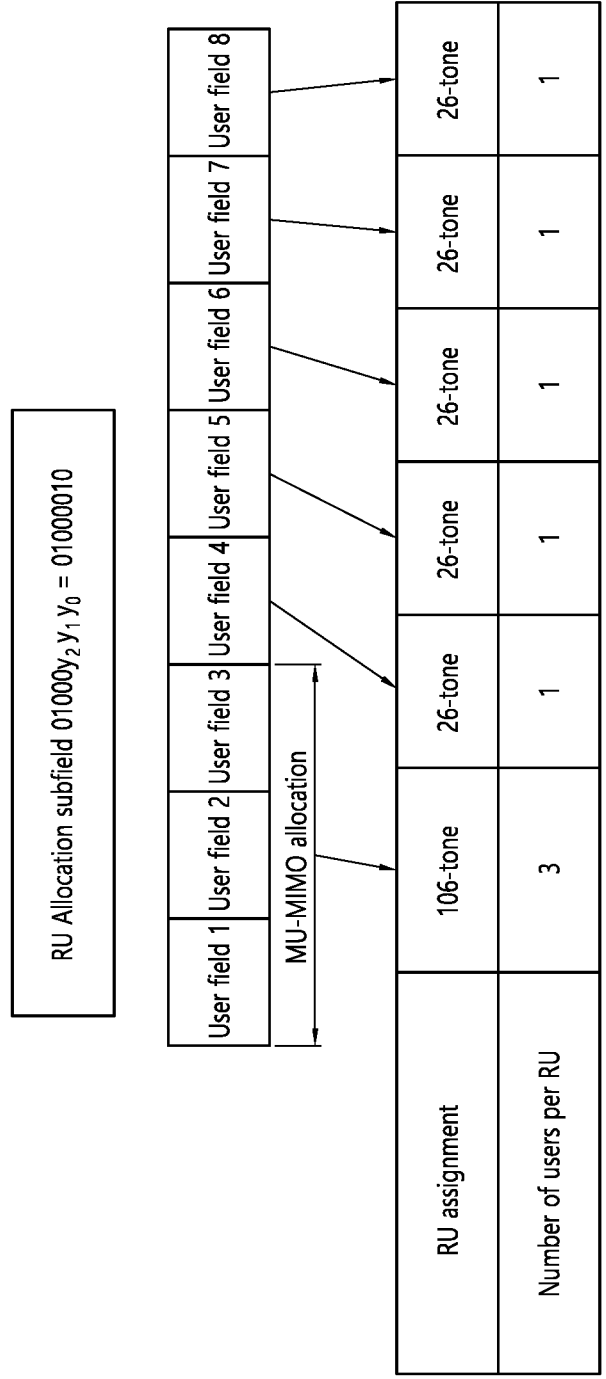
FIG. 8 illustrates an example in which a plurality of user STAs are allocated to the same RU through a MU-MIMO scheme.

FIG. 8 illustrates an example in which a plurality of user STAs are allocated to the same RU through a MU-MIMO scheme.

For example, when RU allocation is set to "01000010" as shown in FIG. 7, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 730 of HE-SIG-B may include eight user fields.

Figure 9:
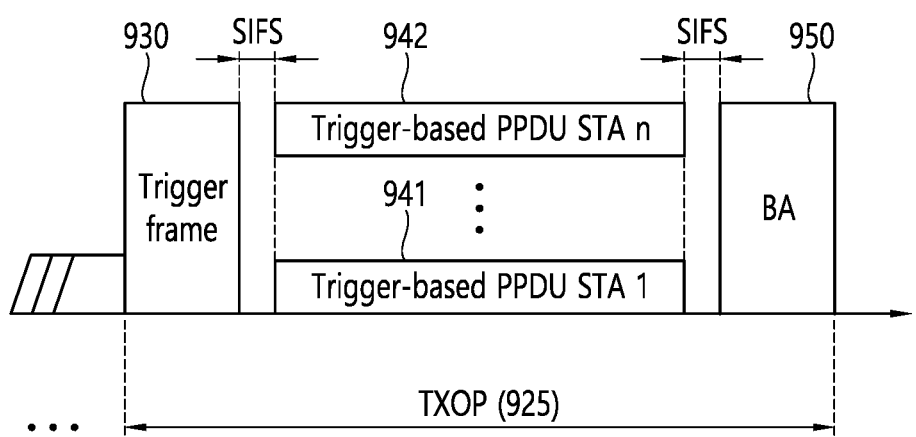
FIG. 9 illustrates an operation based on UL-MU.

The eight user fields may be expressed in the order shown in FIG. 9. In addition, as shown in FIG. 7, two user fields may be implemented with one user block field.

The user fields shown in FIG. 7 and FIG. 8 may be configured based on two formats. That is, a user field related to a MU-MIMO scheme may be configured in a first format, and a user field related to a non-MIMO scheme may be configured in a second format. Referring to the example of FIG. 8, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA- As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 8, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 8, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

FIG. 9 illustrates an operation based on UL-MU. As illustrated, a transmitting STA (e.g., AP) may perform channel access through contending (e.g., a backoff operation), and may transmit a trigger frame 930. That is, the transmitting STA may transmit a PPDU including the trigger frame 930. Upon receiving the PPDU including the trigger frame, a trigger-based (TB) PPDU is transmitted after a delay corresponding to SIFS.

TB PPDUs 941 and 942 may be transmitted at the same time period, and may be transmitted from a plurality of STAs (e.g., user STAs) having AIDs indicated in the trigger frame 930. An ACK frame 950 for the TB PPDU may be implemented in various forms.

Figure 10:
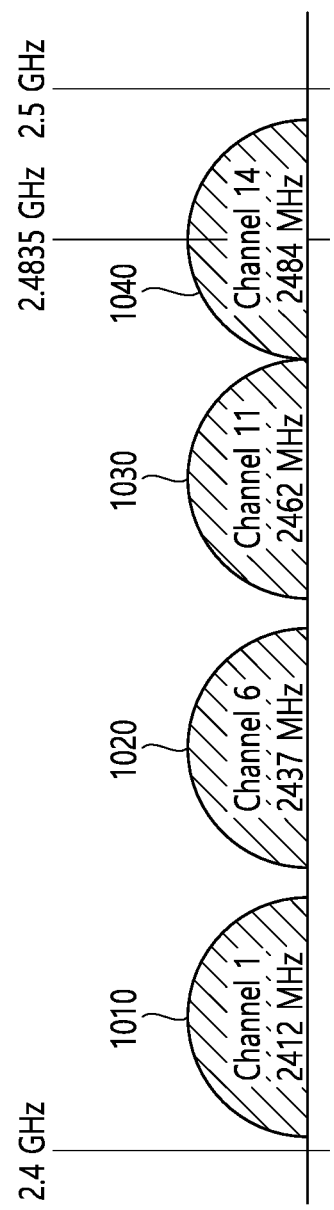
FIG. 10 illustrates an example of a channel used/supported/defined within a 2.4 GHz band.

FIG. 10 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 10 exemplifies 4 channels within a 2.4 GHz band. Each of 1st to 4th frequency domains 1010 to 1040 shown herein may include one channel. For example, the 1st frequency domain 1010 may include a channel 1 (a 20 MHz channel having an index 1). In this case, a center frequency of the channel 1 may be set to 2412 MHz. The 2nd frequency domain 1020 may include a channel 6. In this case, a center frequency of the channel 6 may be set to 2437 MHz. The 3rd frequency domain 1030 may include a channel 11. In this case, a center frequency of the channel 11 may be set to 2462 MHz. The 4th frequency domain 1040 may include a channel 14. In this case, a center frequency of the channel 14 may be set to 2484 MHz.

Figure 11:
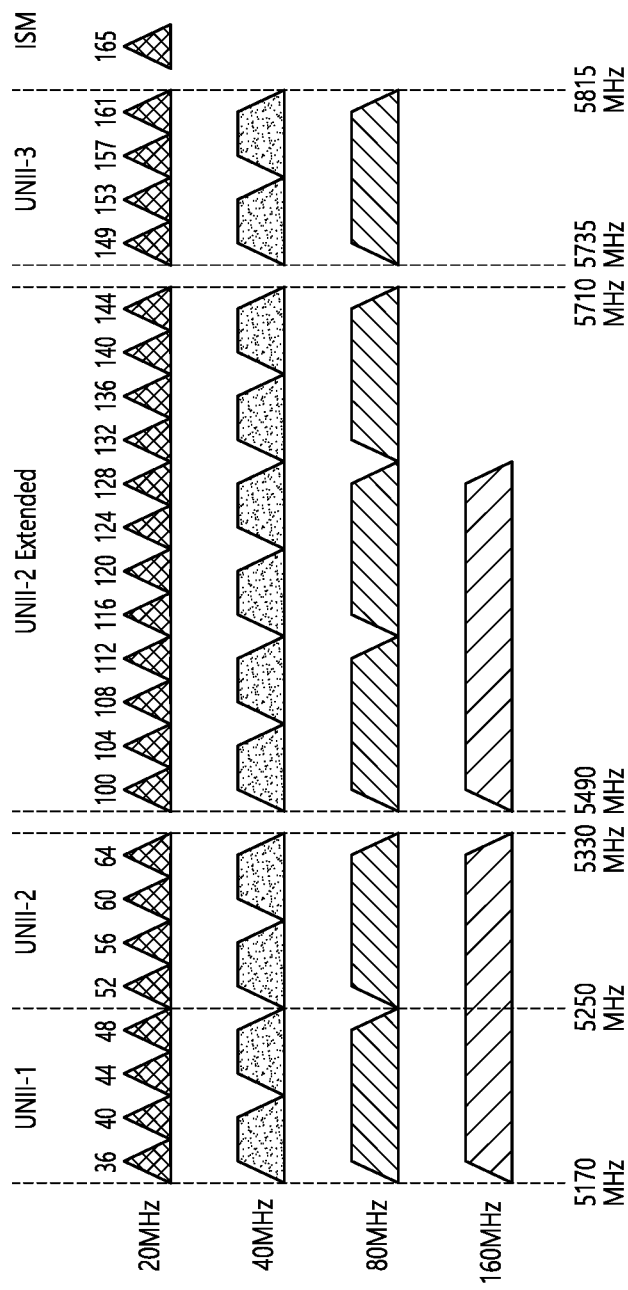
FIG. 11 illustrates an example of a channel used/supported/defined within a 5 GHz band.

FIG. 11 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 11 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 12:
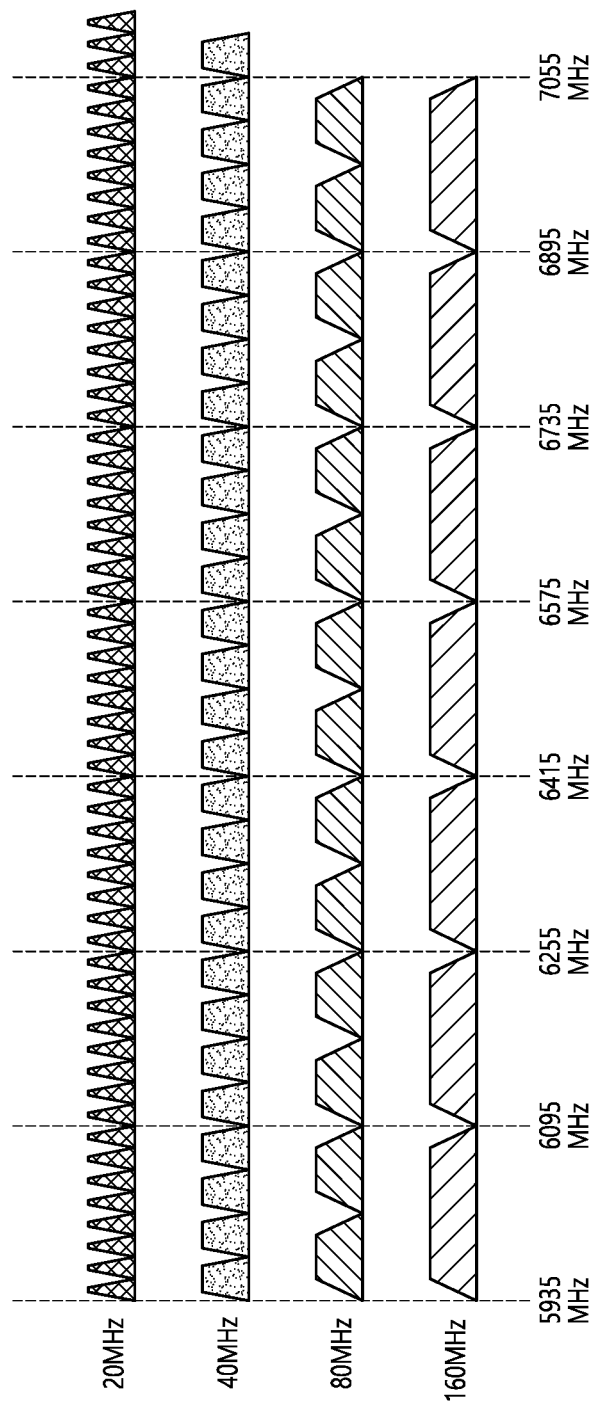
FIG. 12 illustrates an example of a channel used/supported/defined within a 6 GHz band.

FIG. 12 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 12 may be changed.

For example, the 20 MHz channel of FIG. 12 may be defined starting from 5.940 GHz. Specifically, among 20 MHz channels of FIG. 12, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 12 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 13 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 12, a 240 MHz channel or a 320 MHz channel may be additionally added.

Hereinafter, a PPDU transmitted/received in an STA of the present specification will be described.

Figure 13:
FIG. 13 illustrates an example of a PPDU used in the present specification.

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

Figure 14:
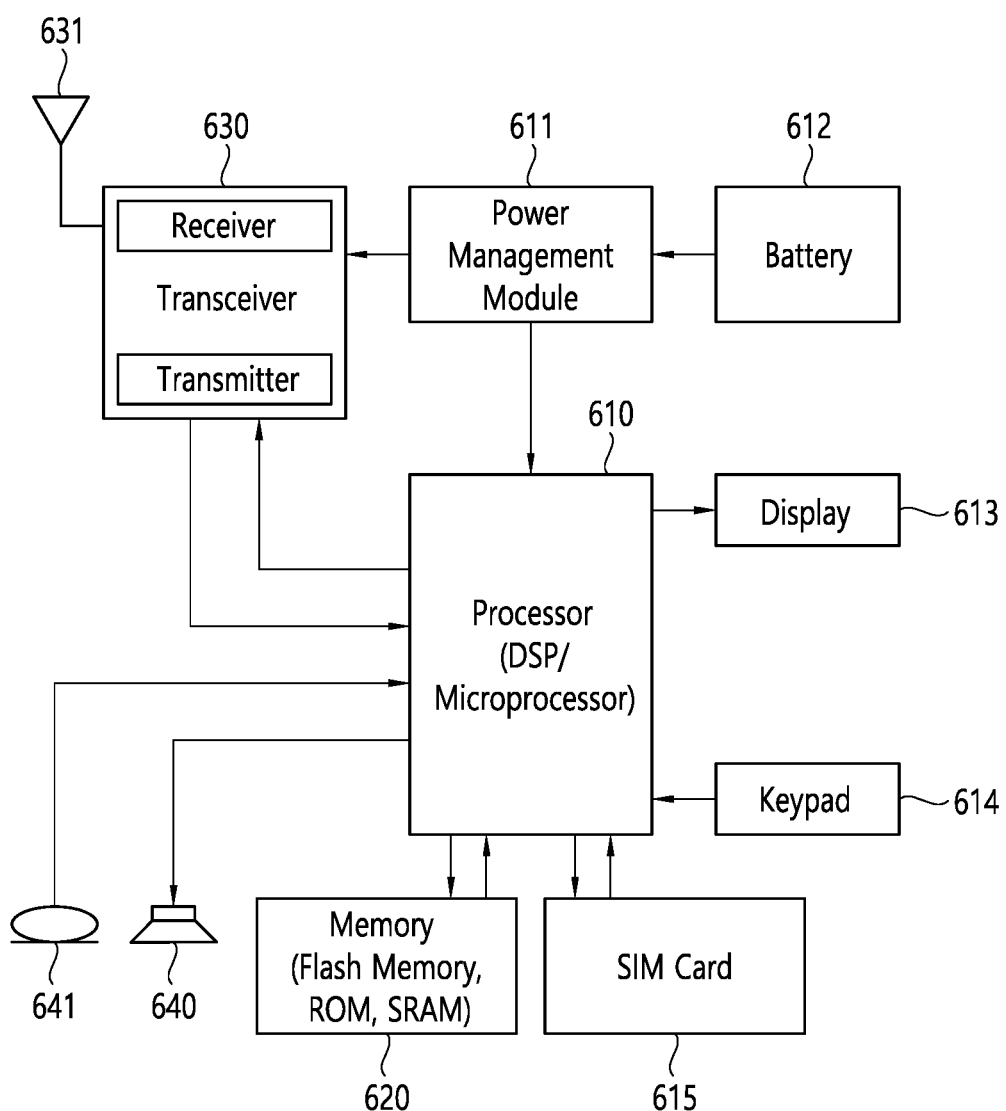
FIG. 14 illustrates an example of a modified transmission device and/or receiving device of the present specification.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 14 is used for a trigger-based (TB) mode, the EHT-SIG of FIG. 13 may be omitted. In other words, an STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTF and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bits information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index+28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 14. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 7 and FIG. 8. For example, the EHT-SIG may include a common field and a user-specific field as in the example of FIG. 7. The common field of the EHT-SIG may be omitted, and the number of user-specific fields may be determined based on the number of users.

As in the example of FIG. 7, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 8, each user field may be related to MU-MIMO allocation, or may be related to non-MU-MIMO allocation.

As in the example of FIG. 7, the common field of the EHT-SIG may include a CRC bit and a tail bit. A length of the CRC bit may be determined as 4 bits. A length of the tail bit may be determined as 6 bits, and may be set to '000000'.

As in the example of FIG. 7, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | | 106 | | | 1 |
| 17 | 26 | 26 | | 52 | | | 106 | | | 1 |
| 18 | 52 | | 26 | 26 | 26 | | 106 | | | 1 |
| 19 | 52 | | 52 | | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | | 52 | | 52 | 1 |
| 25 | 242-tone RU empty (with zero users) | | | | | | | | | 1 |
| 26 | | 106 | | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2 * 966 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | 26 | | 52 + 26 | | 26 | 1 |
| 64 | 26 | | 26 + 52 | | 26 | | 52 + 26 | | 26 | 1 |
| 65 | 26 | | 26 + 52 | | 26 | | 52 | | 52 | 1 |

TABLE 7

| 66 | 52 | | 26 | 26 | 26 | | 52 + 26 | | 26 | 1 |
|---|---|---|---|---|---|---|---|---|---|---|
| 67 | 52 | | | 52 | | 26 | | 52 + 26 | | 26 | 1 |
| 68 | 52 | | | 52 + 26 | | | 52 | | 52 | 1 |
| 69 | 26 | 26 | 26 | 26 | | | 26 + 106 | | | 1 |
| 70 | 26 | | 26 + 52 | | | 26 | | 106 | | | 1 |
| 71 | 26 | 26 | | 52 | | | 26 + 106 | | | 1 |
| 72 | 26 | | 26 + 52 | | | | 26 + 106 | | | 1 |
| 73 | 52 | | 26 | 26 | | | 26 + 106 | | | 1 |
| 74 | 52 | | | 52 | | | 26 + 106 | | | 1 |
| 75 | | 106 + 26 | | | | 26 | 26 | 26 | 26 | 1 |
| 76 | | 106 + 26 | | | | 26 | 26 | | 52 | 1 |
| 77 | | 106 + 26 | | | | | 52 | | 26 | 26 | 1 |
| 78 | | 106 | | | 26 | | 52 + 26 | | 26 | 1 |
| 79 | | 106 + 26 | | | | | 52 + 26 | | 26 | 1 |
| 80 | | 106 + 26 | | | | | 52 | | 52 | 1 |
| 81 | | 106 + 26 | | | | | 106 | | | 1 |
| 82 | | 106 | | | | | 26 + 106 | | | 1 |

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 13 may be used for improving automatic gain control estimation in a multiple input multiple output (MIMO) environment or an OFDMA environment. An HE-LTF of FIG. 13 may be used for estimating a channel in the MIMO environment or the OFDMA environment.

A PPDU (e.g., EHT-PPDU) of FIG. 13 may be configured based on the example of FIG. 4 and FIG. 5.

For example, an EHT PPDU transmitted on a 20 MHz band, i.e., a 20 MHz EHT PPDU, may be configured based on the RU of FIG. 4. That is, a location of an RU of EHT-STF, EHT-LTF, and data fields included in the EHT PPDU may be determined as shown in FIG. 4.

An EHT PPDU transmitted on a 40 MHz band, i.e., a 40 MHz EHT PPDU, may be configured based on the RU of FIG. 5. That is, a location of an RU of EHT-STF, EHT-LTF, and data fields included in the EHT PPDU may be determined as shown in FIG. 5.

Since the RU location of FIG. 5 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 6 but the RU of FIG. 5 is repeated twice.

When the pattern of FIG. 5 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 5 is repeated several times.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT

PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2."

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0," the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 14 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

FIG. 14 illustrates an example of a modified transmission device and/or receiving device of the present specification.

Figure 15:
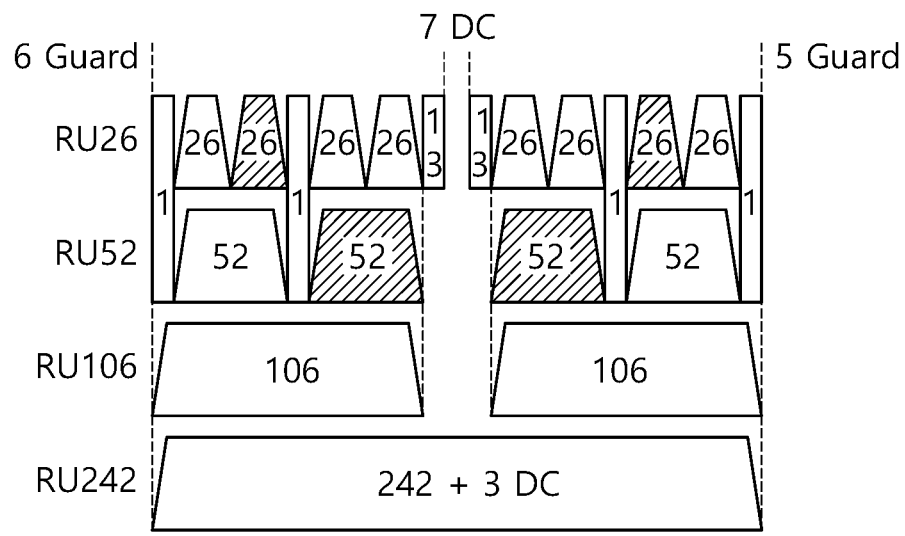
FIG. 15 shows an example of an aggregation of RU26 and RU52 in 20 MHz.

Each device/STA of the sub-figure (a)/(b) of FIG. 1 may be modified as shown in FIG. 15. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

Hereinafter, technical features applicable to the EHT standard may be described.

According to an embodiment, in the EHT standard, a PPDU of a 320 MHz bandwidth may be supported. In addition, 240 MHz and 160+80 MHz transmission may be supported. The 240 MHz and 160+80 MHz may be configured by applying preamble puncturing of 320 MHz to 80 MHz. For example, the 240 MHz and 160+80 MHz bandwidths may be configured based on three 80 MHz channels including the primary 80 MHz.

According to an embodiment, in the EHT standard, an flax standard tone plan may be used for a 20/40/80/160 MHz PPDU. According to an embodiment, a 160 MHz OFDMA tone plan of the flax standard may be duplicated and used for a 320 MHz PPDU.

According to an embodiment, the 240 MHz and 160+80 MHz transmission may be composed of three 80 MHz segments. According to an embodiment, the 160 MHz tone plan may be duplicated and used for the non-OFDMA tone plan of the 320 MHz PPDU.

According to an embodiment, in each 160 MHz segment for the non-OFDMA tone plan of the 320 MHz PPDU, 12 and 11 null tones may be configured on the leftmost and rightmost sides, respectively.

According to an embodiment of the present specification, the data part of the EHT PPDU may use the same subcarrier spacing as the data part of the IEEE 802.11ax standard.

Hereinafter, technical features of a resource unit (RU) applicable to the EHT standard will be described.

According to an embodiment of the present specification, in the EHT standard, one or more RUs may be allocated to a single STA. For example, coding and interleaving schemes for multiple RUs allocated to a single STA may be variously set.

According to an embodiment of the present specification, small-size RUs may be aggregated with other small-size RUs. According to an embodiment of the present specification, large-size RUs may be aggregated with other large-size RUs.

For example, RUs of 242 tones or more may be defined/set as 'large size RUs'. For another example, RUs of less than 242 tones may be defined/configured as 'small size RUs'.

According to an embodiment of the present specification, there may be one PSDU per STA for each link. According to an embodiment of the present specification, for LDPC encoding, one encoder may be used for each PSDU.

Small-Size RUs

According to an embodiment of the present specification, an aggregation of small-size RUs may be set so as not to cross a 20 MHz channel boundary. For example, RU106+RU26 and RU52+RU26 may be configured as an aggregation of small-size RUs.

According to an embodiment of the present specification, in PPDUs of 20 MHz and 40 MHz, contiguous RU26 and RU106 may be aggregated/combined within a 20 MHz boundary.

According to an embodiment of the present specification, in PPDUs of 20 MHz and 40 MHz, RU26 and RU52 may be aggregated/combined.

Figure 21:
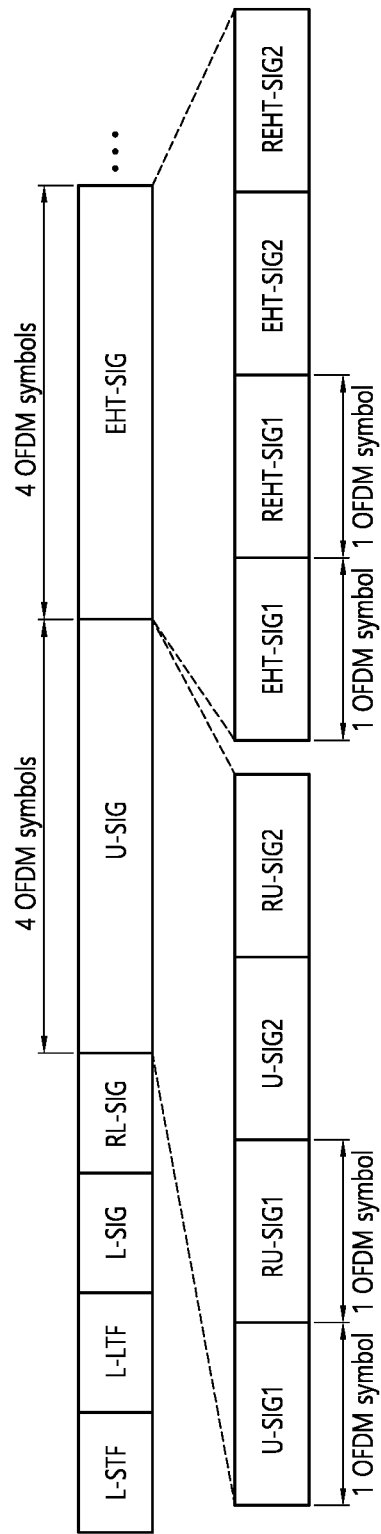
FIG. 21 shows another example of a symbol for a control signal field according to the present specification.

For example, in 20 MHz (or 20 MHz PPDU), an example of contiguous RU26 and RU52 may be shown through FIG. 21.

FIG. 15 shows an example of an aggregation of RU26 and RU52 in 20 MHz.

Referring to FIG. 15, shaded RU26 and RU52 may be aggregated. For example, the second RU26 and the second RU52 may be aggregated. For another example, the seventh RU and the third RU52 may be aggregated.

For example, in 40 MHz, an example of contiguous RU26 and RU52 is described in FIG. 15.

Figure 16:
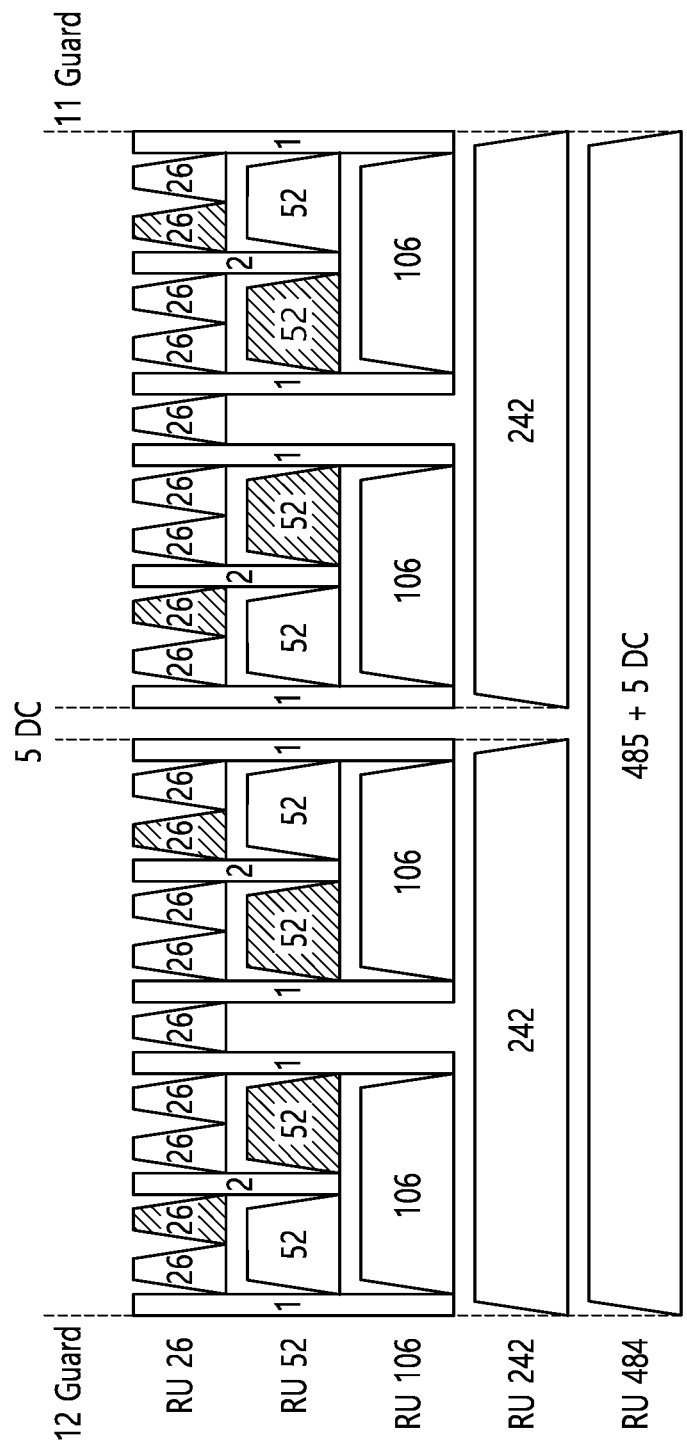
FIG. 16 shows an example of an aggregation of RU26 and RU52 in 40 MHz.

FIG. 16 shows an example of an aggregation of RU26 and RU52 in 40 MHz.

Referring to FIG. 16, shaded RU26 and RU52 may be aggregated. For example, the second RU26 and the second RU52 may be aggregated. For another example, the eighth RU26 and the third RU52 may be aggregated. For another example, the eleventh RU26 and the sixth RU52 may be aggregated. For another example, the seventeenth RU26 and the seventh RU52 may be aggregated.

According to an embodiment of the present specification, RU26 and RU52 may be aggregated/combined in a PPDU of 80 MHz.

Figure 17:
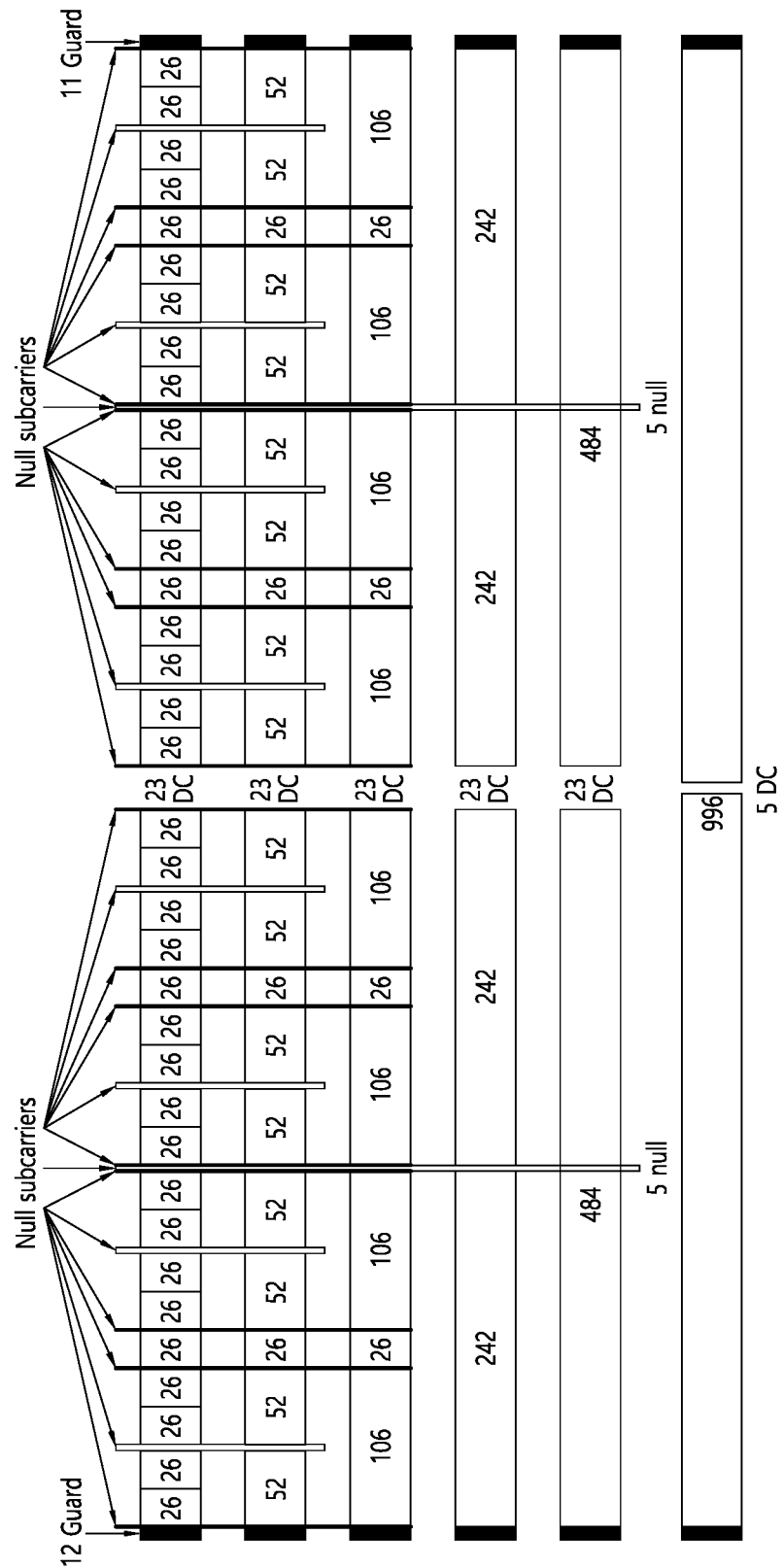
FIG. 17 shows an example of an aggregation of RU26 and RU52 in 80 MHz.

For example, an example of contiguous RU26 and RU52 in 80 MHz may be shown by FIG. 17.

FIG. 17 shows an example of an aggregation of RU26 and RU52 in 80 MHz.

Referring to FIG. 17, 80 MHz may be divided into the first 40 MHz and the second 40 MHz. For example, within the first 40 MHz, the 8th RU26 and the 3rd RU52 may be aggregated. For another example, within the first 40 MHz, the 11th RU26 and the 6th RU52 may be aggregated. For another example, within the second 40 MHz, the 8th RU26 and the 3rd RU52 may be aggregated. For another example, within the second 40 MHz, the 11th RU26 and the 6th RU52 may be aggregated.

According to an embodiment, when LDPC coding is applied, a single tone mapper may be used for RUs having less than 242 tones.

Large-Size RUs

According to an embodiment, in OFDMA transmission of 320 MHz for a single STA, an aggregation of a large-size RUs may be allowed only within a primary 160 MHz or a secondary 160 MHz. For example, the primary 160 MHz (channel) may consist of a primary 80 MHz (channel) and a secondary 80 MHz (channel). The secondary 160 MHz (channel) can be configured with channels other than the primary 160 MHz.

According to an embodiment, in OFDMA transmission of 240 MHz for a single STA, an aggregated of large-size RUs may be allowed only within 160 MHz (band/channel), and the 160 MHz may consist of two adjacent 80 MHz channels.

According to an embodiment, in OFDMA transmission of 160+80 MHz for a single STA, an aggregation of large-size RUs may be allowed only within a continuous 160 MHz (band/channel) or within the remaining 80 MHz (band/channel).

In 160 MHz OFDMA, an aggregation of large-size RUs configured as shown in Table 8 may be supported.

TABLE 8

| RU size | Aggregate BW | Notes |
| --- | --- | --- |
| 484 + 996 | 120 MHz | 4 options |

In 80 MHz OFDMA, an aggregation of large-size RUs configured as shown in Table 9 may be supported.

TABLE 9

| RU size | Aggregate BW | Notes |
| --- | --- | --- |
| 484 + 242 | 60 MHz | 4 options |

In 80 MHz non-OFDMA, an aggregation of large-size RUs configured as shown in Table 10 may be supported. In 80 MHz non-OFDMA, puncturing can be applied. For example, one of four 242 RUs may be punctured.

TABLE 10

| RU size | Aggregate BW | Notes |
| --- | --- | --- |
| 484 + 242 | 60 MHz | 4 options |

In 160 MHz non-OFDMA, an aggregation of large-size RUs configured as shown in Table 11 may be supported. In 160 MHz non-OFDMA, puncturing can be applied. For example, one of eight 242 RUs may be punctured. For another example, one of four 484 RUs may be punctured.

TABLE 11

| 80 MHz RU Size | 80 MHz RU size | Aggregate BW | Notes |
| --- | --- | --- | --- |
| 484 | 996 | 120 MHz | 4 options |
| 484 + 242 | 996 | 140 MHz | 8 options |

In 240 MHz non-OFDMA, an aggregation of large-size RUs configured as shown in Table 12 may be supported. In 240 MHz non-OFDMA, puncturing can be applied. For example, one of six 484 RUs may be punctured. For another example, one of three 996 RUs may be punctured.

TABLE 12

| 80 MHz RU size | 80 MHz RU size | 80 MHz RU size | Aggregate BW | Notes |
| --- | --- | --- | --- | --- |
| 484 | 996 | 996 | 200 MHz | 6 options |
| — | 996 | 996 | 460 MHz | 3 options |

In 320 MHz non-OFDMA, an aggregation of large-size RUs configured as shown in Table 13 may be supported. In 320 MHz non-OFDMA, puncturing can be applied. For example, one of eight 484 RUs may be punctured. For another example, one of four 996 RUs may be punctured.

TABLE 13

| 80 MHz RU size | 80 MHz RU size | 80 MHz RU size | 80 MHz RU size | Aggregate BW | Notes |
| --- | --- | --- | --- | --- | --- |
| 484 | 996 | 996 | 996 | 280 MHz | 8 options |
| — | 996 | 996 | 996 | 240 MHz | 4 options |

Hereinafter, technical features related to the operating mode will be described.

According to an embodiment, a station (STA) supporting the EHT standard STA (hereinafter, "EHT STA") or a station (STA) supporting the EHT standard STA (hereinafter, "HE STA") may operate in a 20 MHz channel width mode. In the 20 MHz channel width mode, the EHT STA may operate by reducing the operating channel width to 20 MHz using an operating mode indication (OMI).

According to an embodiment, the EHT STA (or HE STA) may operate in an 80 MHz channel width mode. For example, in the 80 MHz channel width mode, the EHT STA may operate by reducing the operating channel width to 80 MHz using an operating mode indication (OMI).

According to an embodiment, the EHT STA may support sub-channel selective transmission (SST). An STA supporting the SST can quickly select (and switch to) another channel between transmissions to cope with fading in a narrow sub-channel.

The 802.11be standard (i.e., the EHT standard) can provide a higher data rate than the 802.11ax standard. The EHT (i.e., extreme high throughput) standard can support wide bandwidth (up to 320 MHz), 16 streams, and multi-band operation.

In the EHT standard, various preamble puncturing or multiple RU allocation may be supported in wide bandwidth (up to 320 MHz) and SU/MU transmission. In addition, in the EHT standard, a signal transmission/reception method through 80 MHz segment allocation is considered in order to support an STA with low end capability (e.g., 80 MHz only operating STA). Accordingly, in the following specification, a method of configuring/transmitting an EHT-SIG for the MU transmission in consideration of sub-channel selective transmission (SST) defined in the flax standard and Multi-RU aggregation may be proposed. For example, the EHT-SIG may be configured as a self-contained EHT-SIG. When the self-contained EHT-SIG is used, a technical feature for signaling RU allocation may be proposed in the present specification.

EHT PPDU Configuration

In order to support a transmission method based on the EHT standard, a new frame format may be used. When transmitting a signal through the 2.4/5/6 GHz band based on the new frame format, conventional Wi-Fi receivers (or STAs) (e.g., 802.11n) as well as receivers supporting the EHT standard receivers in compliance with the 802.11n/ac/ax standard) can also receive EHT signals transmitted through the 2.4/5/6 GHz band.

The preamble of the PPDU based on the EHT standard can be set in various ways. Hereinafter, an embodiment of configuring the preamble of the PPDU based on the EHT standard will be described. Hereinafter, a PPDU based on the EHT standard may be described as an EHT PPDU. However, the EHT PPDU is not limited to the EHT standard. The EHT PPDU may include not only the 802.11be standard (i.e., the EHT standard), but also a PPDU based on a new standard that is improved/evolved/extended with the 802.11be standard.

Figure 18:
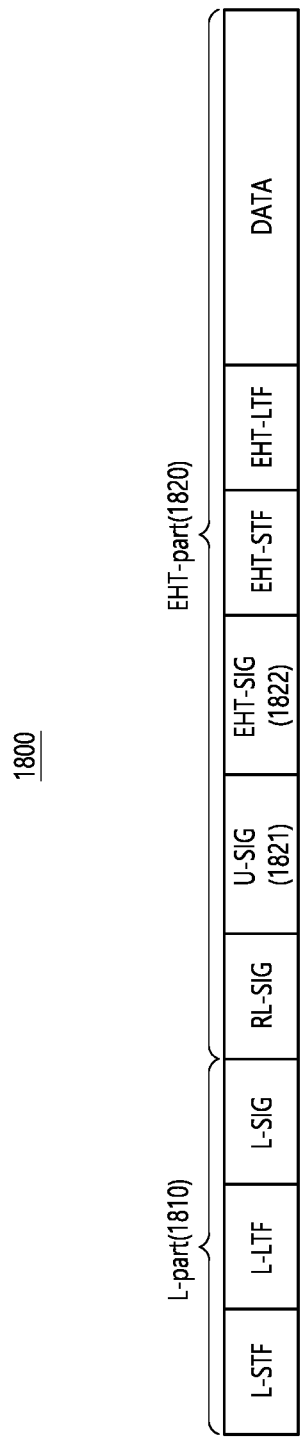
FIG. 18 shows an example of an EHT PPDU.

FIG. 18 shows an example of an EHT PPDU.

Referring to FIG. 18, an EHT PPDU 1800 may include an L-part 1810 and an EHT-part 1820. The EHT PPDU 1800 may be configured in a format to support backward compatibility. In addition, the EHT PPDU 1800 may be transmitted to a single STA and/or multiple STAs. The EHT PPDU 1800 may be an example of an MU-PPDU of the EHT standard.

The EHT PPDU 1800 may include the L-part 1810 preceding the EHT-part 1820 for coexistence or backward compatibility with a legacy STA (e.g., STA in compliance with the 802.11n/ac/ax standard). For example, the L-part 1810 may include L-STF, L-LTF, and L-SIG. For example, phase rotation may be applied to the L-part 1810.

According to an embodiment, the EHT part 1820 may include RL-SIG, U-SIG 1821, EHT-SIG 1822, EHT-STF, EHT-LTF, and data fields. Similar to the 11ax standard, RL-SIG may be included in the EHT part 1820 for L-SIG reliability and range extension. The RL-SIG may be transmitted immediately after the L-SIG, and may be configured to repeat the L-SIG. For example, four additional subcarriers may be applied to L-SIG and RL-SIG. The extra subcarriers may be configured at subcarrier indices [−28, −27, 27, 28]. The extra subcarriers may be modulated in a BPSK scheme. In addition, coefficients of [−1−1 −1 1] may be mapped to the extra subcarriers.

For example, the EHT-LTF may be one of 1×EHT-LTF, 2× EHT-LTF, or 4× EHT-LTF. The EHT standard may support EHT-LTF for 16 spatial streams.

Each field in FIG. 18 may be the same as the corresponding field described in FIG. 13.

Hereinafter, technical features that can be further improved in the present specification will be described.

In a wireless LAN system, a 6 GHz band may be newly established. The 6 GHz band may include 20/40/80/160/320 MHz channels in the frequency domain described with reference to FIG. 12. For example, when transmitting and receiving a signal in an indoor environment through the 6

GHz band, low power transmission may have to be performed. That is, for the existing transceiver used in the 6 GHz band, the transmission power of the wireless LAN signal may be limited. As a result, when a PPDU (for example, the EHT PPDU) is transmitted/received through a 6 GHz band, a problem in that a transmission range is shortened due to the low power transmission may occur. Accordingly, the present specification proposes a transmission/reception technique for range extension. On the other hand, although the example of the present specification is preferably applied to PPDU transmission/reception in the 6 GHz band, it may be used in other bands in which a problem of a short transmission range may occur.

The present specification proposes various technical features for range extension. The various technical features proposed in the present specification are preferably applied to the transmission/reception PPDU. In other words, an example of the present specification proposes various transmission/reception PPDUs for range extension. An example of the transmitting/receiving PPDU may include various fields described in FIGS. 3, 7, 8, 13, 18, and 19.

More specifically, an example of the transmission/reception PPDU may include at least one legacy field (for example, L-STF, L-LTF, L-SIG, and RL-SIG in FIG. 18). In addition, an example of the transmission/reception PPDU includes a first control signal field (for example, U-SIG field) and a second control signal field (for example, EHT-SIG field) for the transmission/reception PPDU. For example, the first control signal field may be the U-SIG 1821 of FIG. 18, and the second control signal field may be the EHT-SIG 1822 of FIG. 18. In addition, an example of the transmitting/receiving PPDU may include an STF (for example, EHT-STF), an LTF (for example, EHT-LTF), and a data field.

Various technical features for range extension may be applied to the first control signal field (for example, U-SIG field), the second control signal field (for example, EHT-SIG field), an STF (for example, EHT-STF), an LTF (for example, EHT-LTF), and/or data field.

Hereinafter, the first control signal field (for example, U-SIG field) and the second control signal field (for example, EHT-SIG field) will be described in detail.

Control information not included in the first control signal field (for example, U-SIG field) may be referred to by various names such as overflowed information or overflow information. The second control signal field (for example, EHT-SIG field) may include a common field and a user specific field. Each of the common field and the user specific field may include at least one encoding block (for example, a binary convolutional code (BCC) encoding block). One encoding block may be transmitted/received through at least one symbol, and one encoding block is not necessarily transmitted through one symbol. Meanwhile, one symbol for transmitting the encoding block may have a symbol length of 4 µs.

The transmission/reception PPDU proposed in the present specification may be used for communication for at least one user. For example, the technical features of the present specification may be applied to an MU-PPDU (for example, EHT MU PPDU) according to the 11be standard.

FIG. 19 shows an example of the first control signal field or the U-SIG field of the present specification.

As illustrated, the first control signal field (for example, U-SIG field) may include a version independent field 1910 and a version dependent field 1920. For example, the version independent field 1910 may include control information that is continuously included regardless of the version of the WLAN (for example, IEEE 802.11be and the next-generation standards of 11be). For example, the version dependent field 1920 may include control information dependent on a corresponding Version (for example, IEEE 802.11be standard).

For example, the version independent field 1910 may include a 3-bit version identifier indicating 11be and a Wi-Fi version after 11be, a 1-bit DL/UL field BSS color, and/or information related to TXOP duration. For example, the version dependent field 1920 may include information related to PPDU format type and/or Bandwidth, and MCS.

For example, in the first control signal field (for example, U-SIG field) shown in FIG. 19, two symbols (for example, two consecutive 4 µs-long symbols) may be jointly encoded. In addition, the field of FIG. 19 may be configured based on 52 data tones and 4 pilot tones for each 20 MHz band/channel. In addition, the field of FIG. 19 may be modulated in the same manner as the HE-SIG-A of the conventional 1 lax standard. In other words, the field of FIG. 19 may be modulated based on the BPSK 1/2 code rate.

For example, the second control signal field (for example, EHT-SIG field) may be divided into a common field and a user specific field, and may be encoded based on various MCS levels. For example, the common field may include indication information related to a spatial stream used in a transmission/reception PPDU (for example, a data field) and indication information related to an RU. For example, the user specific field may include ID information used by at least one specific user (or receiving STA), MCS, and indication information related to coding. In other words, the user specific field may include decoding information for a data field (for example, STA ID information allocated to the RU, MSC information, and/or channel coding type/rate information) transmitted through at least one RU indicated by an RU allocation sub-field included in the common field.

An example of an information field/bit that may be included in the first control signal field (for example, U-SIG field) is shown in table 14 below. As will be described below, since there is a restriction on the length of the first control signal field (for example, U-SIG field), some of the fields in table 14 may overflow into other fields. That is, the bit lengths described in the table below may be changed, and at least one of the individual fields/bits listed in the table below may be omitted. Also, other fields/bits may be added.

TABLE 14

| field | bits |
| --- | --- |
| PHY version Identifier | 3 |
| TXOP | 7 |
| BSS Color | 6 |
| DL/UL | 1 |
| BW | 3 |
| PPDU format | 2 |
| # of EHT-SIG symbol | 5 |
| EHT-SIG MCS | 2 |
| GI + LTF | 2 |
| NSTS | 4 |
| Coding | 1 |
| LDPC Extra symbol | 1 |
| Beamformed | 1 |
| Pre-FEC padding | 2 |
| PE Disambiguity | 1 |
| doppler | 1 |
| spatial reuse | 4 |
| beam change | 1 |
| DCM | 1 |
| HARQ | 1 |
| Multi-AP | 1 |
| Compression | ½ |

TABLE 14-continued

| field | bits |
|---|---|
| Puncturing pattern of 80 MHz segment/BW | ¾ |
| CRC | 4 |
| Tail | 6 |

The first control signal field (for example, U-SIG field) may consist of two consecutive symbols. In this case, the maximum number of bits that can be included in the first control signal field (for example, U-SIG field) may be fixed or preset (for example, fixed to 48/52 bits or preset). Accordingly, information that is not included in the first control signal field (for example, U-SIG field) may exist, and such information may be referred to by various names such as overflowed information, overflow information, U-SIG overflow, and U-SIG overflow information/field. According to an example of the present specification, the overflowed information is preferably included in the second control signal field (for example, EHT-SIG field). In addition, since the overflowed information may not be user specific information, the corresponding information is preferably included in the Common field of the second control signal field (for example, EHT-SIG field).

The bandwidth of the first control signal field (for example, U-SIG field) may be 20 MHz. For example, in an 80 MHz PPDU, the U-SIG field may be duplicated 4 times on a frequency. The U-SIG field may include information about a pattern of preamble puncturing applied to the 80 MHz band. For example, the 160 MHz PPDU may include a first U-SIG field for the first 80 MHz band and a second U-SIG field for the second 80 MHz band. The first U-SIG field may include information on a pattern of preamble puncturing applied to the first 80 MHz band. The second U-SIG field may include information on a pattern of preamble puncturing applied to the second 80 MHz band. For example, the 320 MHz PPDU may include first to fourth U-SIG fields, and each U-SIG field may include information about a corresponding 80 MHz puncturing pattern.

The PPDU according to the present specification may be configured based on various modes. For example, the PPDU may be configured based on a plurality of modes (or transmission modes) including the first mode and the second mode. Mode used herein may be replaced by various terms. For example, the mode may be replaced with various expressions such as format, type, PPDU format, PPDU type, preamble format, preamble type, transmission format, and transmission type.

The structure of the PPDU of the present specification may be configured differently according to the mode. For example, the PPDU configured based on the first mode may include a control signal field (for example, U-SIG field) having the first structure or may include a payload (that is, data field) having the first structure. For example, the PPDU configured based on the second mode may include a control signal field (for example, U-SIG field) having the second structure or may include a payload (that is, data field) having the second structure. The control signal field (for example, U-SIG field) having the first structure and the control signal field (for example, U-SIG field) having the second structure may include some identical fields and different fields.

Some of the plurality of (transmission) modes (for example, the first/second mode) may be related to range extension. A wireless LAN (WLAN) system may support a new 6 GHz band in addition to the conventional 2.4 GHz band and 5 GHz band. However, in consideration of the existing 6 GHz equipment, there is a restriction on the transmission power of the WLAN signal related to the 6 GHz band. Due to the limitation of the transmission power, the transmission/reception range of the 6 GHz wireless LAN signal may be reduced. The range extension is related to a technical feature that increases the transmission/reception range of a wireless LAN signal. The range extension is preferably related to communication in the 6 GHz band, but may also be related to the 2.4 GHz band and/or the 5 GHz band. The range extension may be related to various communication and may be related only to single user (SU) communication.

In the present specification, the first mode may be referred to as various expressions such as an Extended Range Single User (ER SU) mode. In the present specification, the second mode may be referred to as various expressions such as a duplicate (DUP) transmission mode, an EHT DUP transmission mode, or a SU DUP mode.

For example, a control signal field (for example, U-SIG field) included in the PPDU configured based on the first mode may include the following control fields (or subfields). Specifically, the U-SIG field configured based on the first mode may include a U-SIG1 part and a U-SIG2 part. In this case, each of the U-SIG1 part and the U-SIG2 part may include 26-bits information. For example, bits B0 to B2 of the U-SIG1 part may include a field related to PHY Version Identifier, bits B3 to B5 of the U-SIG1 part may include a field related to the bandwidth of the PPDU, the B6 bit of the U-SIG1 part may include a field regarding whether the PPDU is used for UL communication or this communication, bits B7 to B12 of the U-SIG1 part may include a field related to a 6-bit identifier for BSS color, bits B13 to B19 of the U-SIG1 part may include information on the TXOP duration for the PPDU, and bits B20 to B25 of the U-SIG1 part may include a reserved field. For example, bits B0 to B15 of the U-SIG2 part may include a reserved field, and bits B16 to B19 of the U-SIG2 part may include CRC information. The CRC information may be generated based on bits B0 to B25 of the U-SIG1 part and bits B0 to B15 of the U-SIG2 part. Bits B20 to B25 of the U-SIG2 part are tail bits and may be set to 0 for the initialization of the convolutional decoder.

For example, a control signal field (for example, U-SIG field) included in a PPDU configured based on the second mode may include the following control fields (or subfields). Specifically, the U-SIG field configured based on the second mode may include a U-SIG1 part and a U-SIG2 part. In this case, each of the U-SIG1 part and the U-SIG2 part may include 26-bits information. For example, bits B0 to B2 of the U-SIG1 part may include a field related to PHY Version Identifier, bits B3 to B5 of the U-SIG1 part may include a field related to the bandwidth of the PPDU, bit B6 of the U-SIG1 part may include a field related to whether the PPDU is used for UL communication or this communication, bits B7 to B12 of the U-SIG1 part may include a field related to a 6-bit identifier related to BSS color, bits B13 to B19 of the U-SIG1 part may include information about the TXOP duration for the PPDU, bits B20 to B24 of the U-SIG1 part may include a reserved field, and bit B25 of the U-SIG1 part may include a validate field. For example, bits B0 to B1 of the U-SIG2 part may include information about the type and compression mode of the PPDU, B2 bit of the U-SIG2 part may include a validate field, bits B3 to B7 of the U-SIG2 part may include a field related to Punctured Channel Information applied to the PPDU, B8 bit of the U-SIG2 part may include a validate field, bits B9 to B10 of the U-SIG2 part may include a field related to MCS applied to a second control signal (for example, EHT-SIG) included in the PPDU, bits B11 to B15 of the U-SIG2 part may include a field related to how many symbols the second control signal (for example, EHT-SIG) included in the PPDU is transmitted, and bits B16 to B19 of the U-SIG2 part may include CRC information. The CRC information may be generated based on bits B0 to B25 of the U-SIG1 part and bits B0 to B15 of the U-SIG2 part. Bits B20 to B25 of the U-SIG2 part may be tail bits and may be set to 0 for the initialization of the convolutional decoder.

A PPDU configured based on the second mode (for example, EHT DUP or SU DUP mode) may have the following technical features. For example, the PPDU related to the second mode may have a bandwidth of 80/160/320 MHz, and preamble puncturing may not be applied. The payload (that is, data field) of the PPDU related to the second mode is modulated based on BPSK, and a DCM scheme may be applied. The payload (that is, data field) of the PPDU related to the second mode may support only one Spatial Stream (SS). When the PPDU related to the second mode has an 80 MHz bandwidth, the corresponding data field may include a first 484-tone RU and a second 484-tone RU in which the first 484-tone RU is duplicated. That is, the first and second 484-tone RUs may be transmitted through different frequency domains in the same time interval. When the PPDU related to the second mode has a bandwidth of 160 MHz, the payload may include two duplicated 996-tone RUs. When the PPDU related to the second mode has a 320 MHz bandwidth, the payload may include two duplicated 2*996-tone RUs.

A PPDU based on the present specification may include a first control signal field (for example, U-SIG field) having the following technical characteristics. Various technical features described below may be applied to various modes including the first/second mode. For example, various technical features described below may be applied to the first mode (that is, ER SU mode).

Technical features 1. The PPDU configured based on the first mode may be referred to by various names such as an 11be extended range (ER) PPDU. Examples of various technical features applied to the 11be ER PPDU may be as follows.

Technical features 1.a. The first control signal field (for example, U-SIG field) of the PPDU includes Common information. In order to increase the robustness of the U-SIG, the U-SIG may be transmitted through a repeated symbol (for example, four repeated symbols) in a time domain.

Technical features 1.a.i. A method of configuring a symbol that is repeated in the time domain for the U-SIG may be determined in various ways. For example, it is possible that the symbol for the U-SIG is simply repeated.

Figure 20:
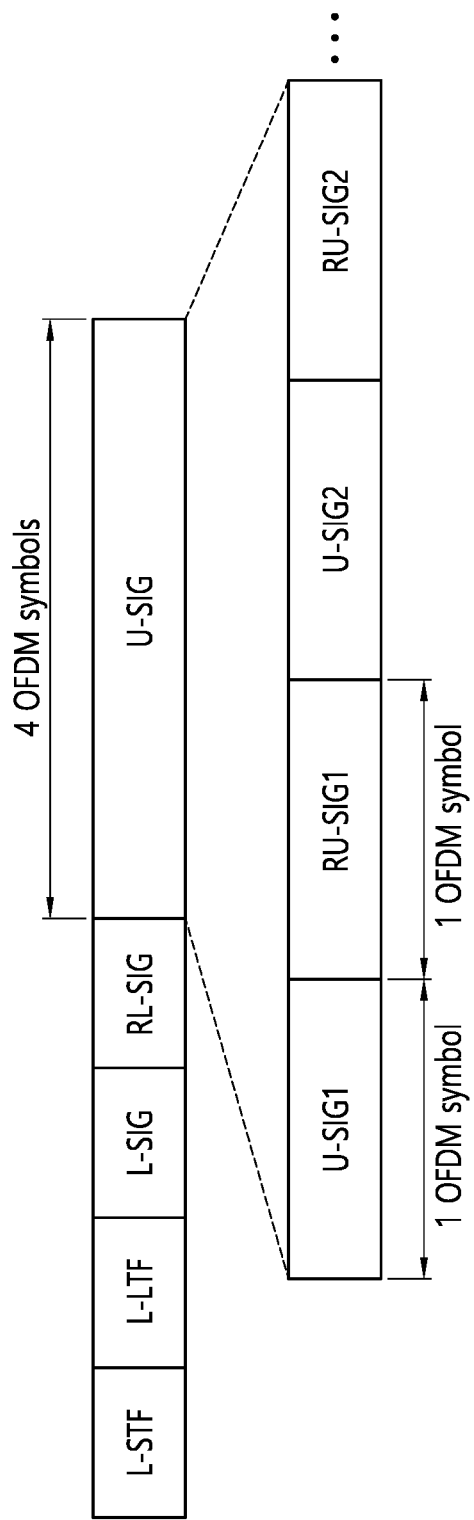
FIG. 20 shows an example of a symbol for a control signal field according to the present specification.

FIG. 20 shows an example of a symbol for a control signal field according to the present specification.

Technical features 1.a.i.1. As in the example of FIG. 20, the U-SIG may be transmitted through a total of 4 symbols (for example, a total of 4 OFDM symbols). In other words, the U-SIG may be repeated in units of one symbol. That is, as shown in FIG. 20, the U-SIG may be transmitted through U-SIG1, RU-SIG1 (that is, the repeated signal of U-SIG1), U-SIG2, and RU-SIG2 (that is, the repeated signal of U-SIG2). U-SIG1 shown in FIG. 20 may correspond to U-SIG1 including bits B0 to B25 as described above, U-SIG2 shown in FIG. 20 may correspond to U-SIG2 including bits B0 to B25 as described above.

Technical features 1.a.ii. The example of FIG. 20 may be variously modified. That is, the example of FIG. 20 may be variously modified as follows.

Technical features 1.a.ii.1. For example, interleaving may not be applied to repeated U-SIG symbols (that is, RU-SIG1 and/or RU-SIG2 of FIG. 20). Additionally or alternatively, the repeated U-SIG symbol (that is, RU-SIG1 and/or RU-SIG2 of FIG. 20) may be further multiplied by a bipolar value/sequence or a preset sequence. In other words, RU-SIG1 (or RU-SIG2) of FIG. 20 may be generated in such a way that '-1' or a preset sequence is multiplied by U-SIG1 (or U-SIG2).

Technical features 1.a.ii.2. In the example of FIG. 20, interleaving is applied to U-SIG1 and U-SIG2, but interleaving may be omitted for repeated U-SIG symbols (that is, RU-SIG1 and/or RU-SIG2 in FIG. 20).

Technical features 1.a.ii.3. BPSK may be applied to U-SIG1 and U-SIG2 shown in the example of FIG. 20. In addition, QBPSK may be applied to RU-SIG1 and/or RU-SIG2 shown in the example of FIG. 20.

The PPDU based on the present specification may include a second control signal field (for example, EHT-SIG field) for allocation of a resource unit (RU). The following technical features may be applied to a PPDU (for example, 11be ER PPDU) configured based on the first mode.

Technical features 1.b. The second control signal field (for example, EHT-SIG field) of the present specification may be transmitted through a symbol that is repeated in the time domain. That is, the symbol for the EHT-SIG of the present specification may be repeated in the time domain for range extension. Additionally or alternatively, a dual carrier modulation (DCM) scheme may be applied to the symbol for the EHT-SIG of the present specification.

FIG. 21 shows another example of a symbol for a control signal field according to the present specification.

Technical features 1.b.i. The EHT-SIG symbol may be repeated in the time domain based on the example of FIG. 21.

Technical features 1.b.i.1. As shown in FIG. 21, the EHT-SIG may consist of 2 symbols and the entire EHT-SIG field may be transmitted through a total of 4 symbols.

Technical features 1.b.i.1.a. For example, as shown in FIG. 21, the EHT-SIG may be transmitted based on a structure that is repeated in symbol units on the time domain. Specifically, the EHT-SIG field may consist of EHT-SIG1 and EHT-SIG2, the EHT-SIG1 may be repeated on the time domain as in the example of FIG. 21, the EHT-SIG2 may also be repeated in the time domain. That is, as the example of FIG. 21, REHT-SIG1 in which the EHT-SIG1 is repeated and REHT-SIG2 in which the EHT-SIG2 is repeated may be configured.

Technical features 1.b.i.1.b. In the example of FIG. 21, the application of interleaving may be omitted for repeated symbols. Specifically, in the example of FIG. 21, interleaving may be applied to EHT-SIG1 and EHT-SIG2, and interleaving may be omitted for REHT-SIG1 and REHT-SIG2.

Technical features 1.b.i.1.c. The above-described technical features may be variously changed. For example, in the example of FIG. 21, repeated symbols (that is, REHT-SIG1 and/or REHT-SIG2) may be configured by a method of applying phase rotation to non-repeated symbols (that is, EHT-SIG1 and/or EHT-SIG2). For example, a repeated symbol (that is, REHT-SIG1 and/or REHT-SIG2) may be configured by multiplying a non-repeated symbol (that is, EHT-SIG1 and/or EHT-SIG2) by a value of −1, −j, +j, or the like. For example, it may be possible to configure the non-repeated symbols (that is, EHT-SIG1 and/or EHT-SIG2) based on the BPSK scheme, and it may be also possible to configure the repeated symbols (that is, REHT-SIG1 and/or REHT-SIG2) based on the QBPSK scheme.

Figure 22:
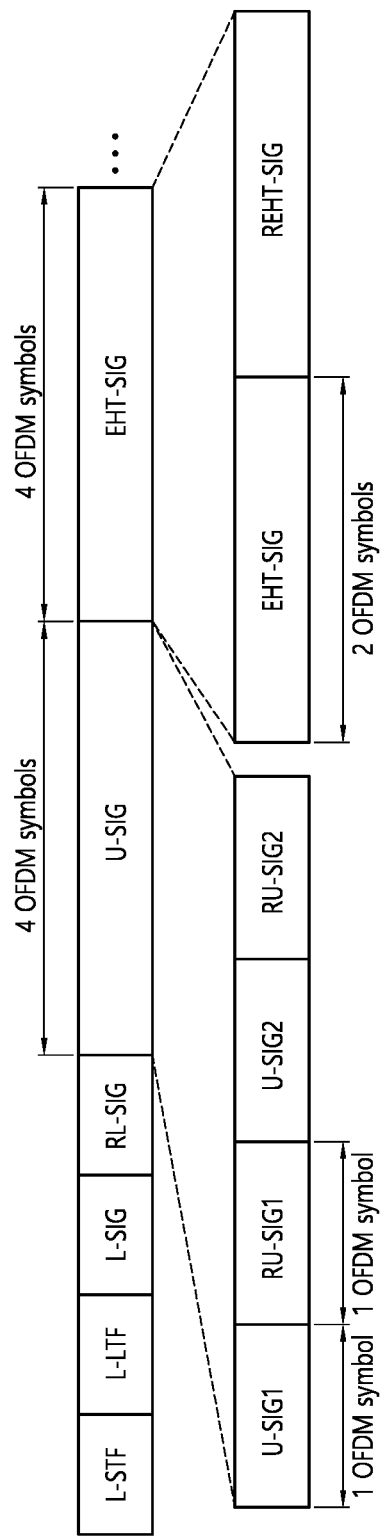
FIG. 22 shows another example of a symbol for a control signal field according to the present specification.

FIG. 22 shows another example of a symbol for a control signal field according to the present specification.

Technical features 1.b.i.1.d. The above-described example may be variously modified. For example, the EHT-SIG may be configured through one encoding block, and common information and identification information about a single user may be included in the one encoding block. In this case, in order to be repeated in units of encoding blocks, the EHT-SIG composed of 2 symbols may be repeated and included in the PPDU. In other words, as shown in FIG. 22, one encoding block for EHT-SIG may be transmitted through 2 symbols. As shown in FIG. 22, the EHT-SIG may include the first two symbols and two repeated symbols (that is, REHT-SIG).

Technical features 1.b.i.1.e. In the example of FIG. 22, interleaving may be omitted for a repeated symbol (that is, EHT-SIG 2 symbol).

Technical features 1.b.i.2. The control signal field (that is, EHT-SIG) according to the present specification may be variously configured. That is, as in the examples of FIGS. 21 and 22, the EHT-SIG may consist of one symbol.

Figure 23:
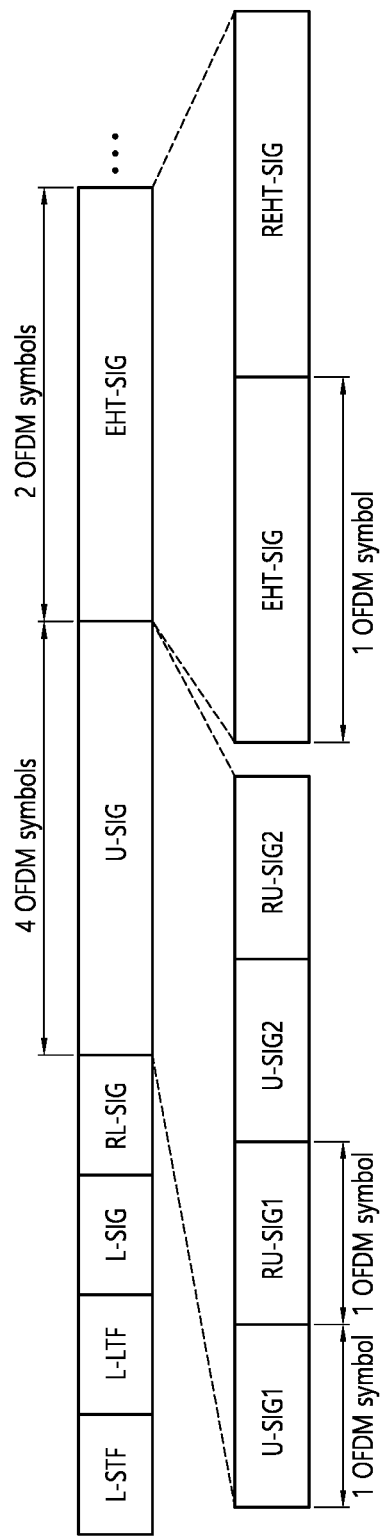
FIG. 23 shows another example of a symbol for a control signal field according to the present specification.

FIG. 23 shows another example of a symbol for a control signal field according to the present specification. As in the example of FIG. 23, the EHT-SIG may consist of one symbol and may be repeated in the time domain.

Technical features 1.b.i.2.a. When the EHT-SIG is configured through one symbol, the EHT-SIG may not include STA-ID information and/or user specific information.

Technical features 1.b.i.2.b. In an example of FIG. 23, REHT-SIG indicates a repeated signal of an EHT-SIG symbol composed of one symbol.

Technical Features 1.b.i.2.c. In the example of FIG. 23, interleaving may be omitted for REHT-SIG. Additionally or alternatively, the EHT-SIG may be configured based on BPSK, and the REHT-SIG may be configured based on QPBSK.

Technical features 1.b.i.3. In the above-described example, whether the DCM scheme is applied to the EHT-SIG may be indicated. In this case, it is preferable that the indication information about the DCM scheme is included in the control field in the U-SIG.

The above technical features are mainly related to the control signal field (that is, U-SIG and EHT-SIG) of the PPDU. Hereinafter, technical features related to the payload (that is, data field) of a PPDU (for example, 11be ER PPDU) configured based on the first mode will be described.

Technical features 1.c. The PPDU (for example, 11be ER PPDU) configured based on the first mode may have various bandwidths, but preferably may have a 20 MHz bandwidth. This is because power boosting is easy when a 20 MHz bandwidth is used. In this case, the following technical features may be applied to RUs and multiple RUs (MRUs) used for the payload (that is, data field) of the PPDU.

Technical features 1.c.i. A PPDU (for example, 11be ER PPDU) configured based on the first mode may include the RU shown in FIG. 4. Specifically, the PPDU of the present specification may include a 52+26-tone MRU, a 106+26-tone MRU, and the like, along with the 26-tone RU, 52-tone RU, and 106-tone RU shown in FIG. 4.

Technical features 1.c.ii. The PPDU of the present specification may include a combination of various RUs according to two methods described below for an extended range.

Technical features 1.c.ii.1. For example, the 11be ER PPDU according to the first method may use RUs of any size. For example, a total of 6 RU sizes (or RU types) such as 26-tone RU, 52-tone RU, 106-tone RU, 242-tone RU, 52+26-tone MRU, and 106+26-tone MRU may be used.

Technical features 1.c.ii.1.a. For example, the 11be ER PPDU may include a payload (that is, a data field) configured based on any one of the six RU sizes (or types) described above.

Technical features 1.c.ii.1.b. The RU (or MRU) used for the payload (that is, data field) of the 11be ER PPDU may be a fixed RU/MRU as follows. For example, the RU index may start from a low or high frequency region in the tone plan (that is, RU location) shown in FIG. 4.

i. 26 RU-26 RU index1
ii. 52 RU-52 RU index1
iii. 26+52 RU-26 RU index2+52 RU index2
iv. 106 RU-106 RU index 1
v. 26+106 RU-106 RU index 1+26 RU index5
vi. 242 RU Technical features 1.c.ii.2. In the first method described above, a total of 6 RU sizes/types are used, but according to the second method described below, only RUs of 106-tone or more can be used.

Technical features 1.c.ii.2.a. For example, only one of 106-tone RU, 106+26-tone RU, and 242-tone RU may be used for the payload (that is, data field) of the 11be ER PPDU.

Technical features 1.c.ii.2.b. As another example, it is possible to use only 106-tone RU and 242-tone RU except for the 106+26-tone RU.

Technical features 1.c.ii.2.c. For the RUs of the above-described Technical features 1.c.ii.2.a and Technical features 1.c.ii.2.b, the RU location may be determined based on the above-described technical characteristic 1.c.ii.1.b.

Technical features 1.c.ii.3. Since the bandwidth of the 11be ER PPDU can be fixed to 20 MHz, the BW field (for example, 3 bits) included in the U-SIG of the 11be ER PPDU can be used for other purposes.

Technical features 1.c.ii.3.a. For example, the BW field (for example, 3 bits) included in the U-SIG may include information indicating RU information, not bandwidth.

Technical features 1.c.ii.3.a.i. For example, when a method using a total of six RU sizes/types is used, the 3-bit BW field included in the U-SIG may include information about the RU size/type according to the method shown in Table 15 below.

TABLE 15

| BW 3 bits | RU size |
| --- | --- |
| 0 | 26 |
| 1 | 52 |
| 2 | 52 + 26 |
| 3 | 106 |
| 4 | 106 + 26 |
| 5 | 242 |
| 6~7 | Reserved |

Technical features 1.c.ii.3.a.ii. For example, when a method using a total of three RU sizes/types is used, the 3-bit BW field included in the U-SIG may include information on the RU size/type according to the method shown in Table 16 below.

TABLE 16

| BW 3 bits | RU size |
|---|---|
| 0 | 106 |
| 1 | 106 + 26 |
| 2 | 242 |
| 3~7 | Reserved |

Technical features 1.c.ii.3.a.iii. For example, when a method using a total of two RU sizes/types is used, the 3-bit BW field included in the U-SIG may include information on the RU size/type according to the method shown in Table 17 below.

TABLE 17

| BW 3 bits | RU size |
|---|---|
| 0 | 106 |
| 1 | 242 |
| 2~7 | Reserved |

Various technical features described below may be additionally applied to the PPDU of the present specification.

Technical features 2. For example, one Spatial Stream (SS) may be used for the payload (that is, data field) of the PPDU used for the extended range. In addition, MCSO (that is, a BPSK scheme and a channel coding scheme based on 1/2 code rate) may be applied to the counter PPDU.

Technical features 3. As described above, since the EHT-SIG included in the PPDU of the present specification may be repeated in the time domain, it may be preferable that the control field of the U-SIG included in the corresponding PPDU include information about the EHT-SIG symbol.

Technical features 3.a. For example, the control field of the U-SIG may indicate the total number of EHT-SIG symbols. For example, indication information related to a total of two symbols or a total of four symbols may be included in the U-SIG.

Technical features 3.b. For another example, the control field of the U-SIG may indicate the number of symbols of the non-repeated EHT-SIG, not the entire EHT-SIG. Since the receiving STA already knows that the EHT-SIG is repeated, the total number of EHT-SIG symbols may not need to be indicated. For example, it may be indicated that one or two EHT-SIG symbols are used.

A new WLAN system such as the 11be system may support different types of mode/transmission. For example, in the 11be system, both ER SU transmission, and SU-DUP mode for obtaining robustness of data transmission may be considered. In other words, the system of the present specification may support multiple modes including a first mode and a second mode, the first mode may be called various expressions such as ER SU mode, the second mode may be referred to as various expressions such as a duplicate (DUP) transmission mode, an EHT DUP transmission mode, or a SU DUP mode. As described above, the PPDU of the present specification may be individually configured according to the first mode and the second mode.

Technical features 4. The PPDU configured based on the first mode (for example, ER SU mode) and the second mode (for example, SU DUP mode) may include the same technical feature. For example, technical features related to the above-described U-SIG and/or EHT-SIG may be equally applied to the first mode and the second mode. In other words, the symbol for transmitting the U-SIG and/or EHT-SIG of the PPDU configured based on the first mode (for example, ER SU mode) may be repeated in the time domain, and a symbol for transmitting the U-SIG and/or EHT-SIG of the PPDU configured based on the second mode (for example, SU DUP mode) may also be repeated in the time domain. Therefore, since the PHY preamble related to the first mode (for example, ER SU mode) and the PHY preamble related to the second mode (for example, SU DUP mode) may have the same configuration, an additional Technical features capable of distinguishing or discriminating the first mode and the second mode may be proposed.

Technical features 4.a. For example, the first/second modes may be distinguished using constellation mapping or the phase of the U-SIG symbol.

Technical features 4.a.i. For example, both the PPDU related to the first mode and the PPDU related to the second mode may include a U-SIG consisting of two parts (that is, U-SIG1 and U-SIG2), RU-SIG1 in which the U-SIG1 is repeated may be located after the U-SIG1, RU-SIG2 in which the U-SIG2 is repeated may be located after the U-SIG2. In this case, the constellation mapping and/or the phase of the U-SIG1 and the RU-SIG1 may be determined as one of tables 18 to 23 below. According to the following example, the first mode (for example, ER SU mode) and the second mode (for example, SU DUP mode) may be identified based on the U-SIG1 and RU-SIG1.

For example, according to the example of Table 18 below, the U-SIG of the PPDU configured based on the first mode (for example, ER SU mode) is transmitted through a total of four symbols consisting of U-SIG1, RU-SIG1, U-SIG2, and RU-SIG2. In this case, a constellation mapping of U-SIG1 and RU-SIG1 related to the first mode may be determined as BPSK and QBPSK. In addition, constellation mapping of U-SIG1 and RU-SIG1 related to the second mode may be QBPSK and BPSK.

In the following example, constellation mapping of U-SIG2 and RU-SIG2 may be BPSK.

TABLE 18

| Index | U-SIG1 | RU-SIG1 | |
|---|---|---|---|
| 1 | BPSK | QBPSK | ER-SU |
| 2 | QBPSK | BPSK | SU-DUP |

TABLE 19

| Index | U-SIG1 | RU-SIG1 | |
|---|---|---|---|
| 1 | BPSK | QBPSK | ER-SU |
| 2 | QBPSK | QBPSK | SU-DUP |

TABLE 20

| Index | U-SIG1 | RU-SIG1 | |
|---|---|---|---|
| 1 | QBPSK | BPSK | ER-SU |
| 2 | BPSK | QBPSK | SU-DUP |

TABLE 21

| Index | U-SIG1 | RU-SIG1 | |
|---|---|---|---|
| 1 | QBPSK | BPSK | ER-SU |
| 2 | QBPSK | QBPSK | SU-DUP |

TABLE 22

| Index | U-SIG1 | RU-SIG1 | |
|---|---|---|---|
| 1 | QBPSK | QBPSK | ER-SU |
| 2 | BPSK | QBPSK | SU-DUP |

TABLE 23

| Index | U-SIG1 | RU-SIG1 | |
|---|---|---|---|
| 1 | QBPSK | QBPSK | ER-SU |
| 2 | QBPSK | BPSK | SU-DUP |

Technical features 4.b. The above-described technical features may be variously modified. For example, in the above example, both U-SIG1 related to the first mode and U-SIG1 related to the second mode have the same constellation mapping, but it is also possible that the RU-SIG1 related to the first mode and the RU-SIG1 related to the second mode have different constellation mappings and/or phases.

Technical features 4.c. For example, it is also possible to distinguish the first mode and the second mode by multiplying any one symbol for U-SIG (for example, RU-SIG1) by different phase values (for example, −1, +j, −j).

Figure 24:
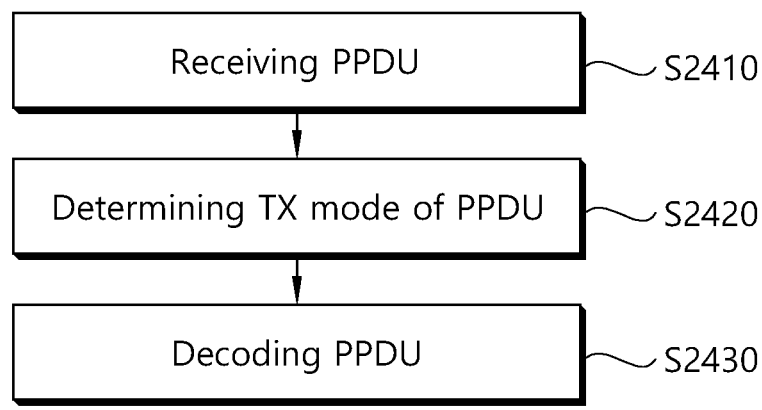
FIG. 24 is a flowchart illustrating an operation performed by a receiving STA.

FIG. 24 is a flowchart illustrating an operation performed by a receiving STA. The receiving STA may be an AP STA or a user STA. The receiving STA may receive and decode the PPDU configured according to the above-described technical features.

Based on S2410 of FIG. 24, the receiving STA may receive a PPDU. For example, the PPDU may be received through a 6 GHz band. For example, the PPDU may be configured based on the first mode (for example, the above-described ER SU mode) or the second mode (for example, the above-described SU DUP mode). For example, the first mode may be expressed as a transmission mode related to an extended range (ER) preamble. For example, the second mode may be expressed as a transmission mode related to duplicate transmission. The PPDU may include a legacy signal (L-SIG) field, a repeated L-SIG (RL-SIG) field in which the L-SIG field is repeated, and a Universal Signal (U-SIG) field contiguous to the RL-SIG field. For example, the PPDU may include the L-SIG, RL-SIG, and U-SIG shown in FIGS. 20 to 23. For example, the PPDU may further include the EHT-SIG shown in FIGS. 20 to 23.

The U-SIG field of the PPDU may be transmitted/received through consecutive first to fourth symbols. The first to fourth symbols may be U-SIG1, RU-SIG1, U-SIG2, and RU-SIG2 shown in FIGS. 20 to 23. The first to fourth symbols may be contiguous with each other in the time domain. Among the first to fourth symbols, the second symbol may include information in which bit information of the first symbol is repeated. For example, the bit information of the first symbol may mean 26-bits information of the U-SIG1 (that is, information composed of bits B0 to B25 of the above-described U-SIG1). For example, the second symbol may include the same 26-bits information of the U-SIG1. For example, the first and second symbols may include the same information bit (that is, 26-bits information of the U-SIG1) and may have different constellation mappings. Among the first to fourth symbols, the fourth symbol may include information in which bit information of the third symbol is repeated. For example, the bit information of the third symbol may mean 26-bits information of the U-SIG2 (that is, information composed of B0 to B25 bits of the above-described U-SIG2). For example, the third and fourth symbols may include the same information bit (that is, 26-bits information of the U-SIG2).

Based on S2420 of FIG. 24, the receiving STA may determine the transmission mode of the PPDU based on the constellation mapping pattern of the first and second symbols. For example, the constellation mapping pattern for the first mode may have a first mapping pattern, and the constellation mapping pattern for the second mode may have a second mapping pattern. For example, the first mapping pattern may mean a constellation mapping pattern indicated by index 1 in Tables 18 to 23. For example, the second mapping pattern may mean a constellation mapping pattern indicated by index 2 in Tables 18 to 23.

Based on S2430 of FIG. 24, the receiving STA may decode the PPDU. Through the S2420, the receiving STA can know the transmission mode of the PPDU. Accordingly, the receiving STA decodes the U-SIG and EHT-SIG configured according to the first mode or the second mode, and through this, may decode the payload (that is, data field) of the PPDU.

The operation of FIG. 24 may be performed by the apparatus of FIGS. 1 and/or 14. For example, the transmitting STA may be implemented with the apparatus of FIGS. 1 and/or 14. The processor of FIGS. 1 and/or 14 may perform the above-described operation of FIG. 24. In addition, the transceiver of FIG. 1 and/or FIG. 14 may perform the operation described in FIG. 24.

Figure 25:
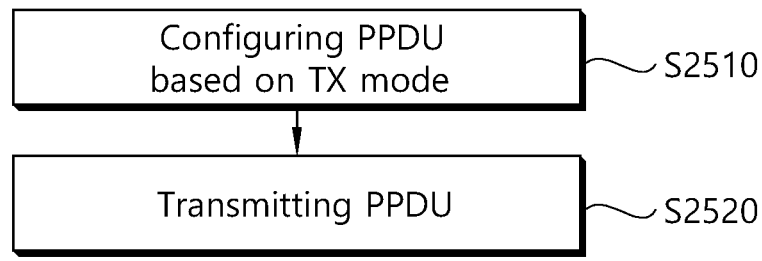
FIG. 25 is a flowchart illustrating an operation performed by a transmitting STA.

FIG. 25 is a flowchart illustrating an operation performed by a transmitting STA. The transmitting STA may be an AP STA or a user STA. The transmitting STA may configure a PPDU according to the above-described technical features, and may perform an operation of transmitting the configured PPDU to the receiving STA. The technical features related to FIG. 24 may be equally applied to FIG. 25.

Based on S2510 of FIG. 25, the transmitting STA may configure a PPDU. As described above, the PPDU may be configured based on the first mode (for example, the above-described ER SU mode) or the second mode (for example, the above-described SU DUP mode). The technical features of the PPDU of FIG. 25 may be the same as those of the PPDU of FIG. 24.

Based on S2520 of FIG. 25, the transmitting STA may transmit the PPDU to the receiving STA.

The operation of FIG. 25 may be performed by the apparatus of FIGS. 1 and/or 14.

For example, the transmitting STA may be implemented with the apparatus of FIGS. 1 and/or 14. The processor of FIGS. 1 and/or 14 may perform the above-described operation of FIG. 25. In addition, the transceiver of FIG. 1 and/or FIG. 14 may perform the operation described in FIG. 25.

The apparatus (for example, a transmitting STA and a receiving STA) proposed in the present specification may not necessarily include a transceiver, and may be implemented in the form of a chip including a processor and a memory. Such a device may generate/store a transmit/receive PPDU according to the above-described example. Such a device may be connected to a separately manufactured transceiver to support actual transmission and reception.

The present specification proposes a computer readable recording medium implemented in various forms. A computer readable medium according to the present specification may be encoded with at least one computer program including instructions. The instructions stored in the medium may control the processor described in FIGS. 1 and/or 14. That is, the instructions stored in the medium control the processor presented herein to perform the above-described operations of the transmitting and receiving STAs (for example, FIGS. 24 to 25).

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method in a wireless local area network (WLAN) system, the method comprising:
  receiving, by a receiving station (STA), a physical protocol data unit (PPDU),
  wherein the PPDU includes a legacy signal (L-SIG) field, a repeated L-SIG (RL-SIG) field which is a repeat of the L-SIG field, and a Universal Signal (U-SIG) field contiguous to the RL-SIG field,
  wherein the PPDU is an extremely high throughput (EHT) PPDU,
  wherein the L-SIG field includes a length field which is set to a value satisfying a condition that a remainder is zero when the length field is divided by three,
  wherein the U-SIG field is received through first through fourth symbols,
  wherein the first symbol includes a physical version identifier having a length of three bits,
  wherein the physical version identifier is set to zero to identify the EHT PPDU,
  wherein the second symbol includes information in which bit information of the first symbol is repeated,
  wherein the fourth symbol includes information in which bit information of the third symbol is repeated, and
  wherein the PPDU is configured based on one of a plurality of transmission modes including a first mode related to an Extended Range (ER) preamble and a second mode related to duplicate transmission; and
  determining, by the receiving STA, a transmission mode of the PPDU based on a constellation mapping pattern of the first and second symbols,
  wherein the constellation mapping pattern for the first mode has a first mapping pattern, and
  wherein the constellation mapping pattern for the second mode has a second mapping pattern.

2. The method of claim 1,
  wherein a data field of the PPDU configured based on the second mode is duplicated in frequency.

3. The method of claim 1,
wherein a first symbol based on the first mapping pattern is configured based on binary phase shift keying (BPSK) and a second symbol based on the first mapping pattern is configured based on quadrature BPSK (QBPSK), and
wherein a first symbol based on the second mapping pattern is configured based on QBPSK, and a second symbol based on the second mapping pattern is configured based on BPSK.

4. The method of claim 1,
wherein a first symbol based on the first mapping pattern is configured based on BPSK, and a second symbol based on the first mapping pattern is configured based on QBPSK, and
wherein a first symbol based on the second mapping pattern is configured based on QBPSK, and a second symbol based on the second mapping pattern is configured based on QBPSK.

5. The method of claim 1,
wherein the PPDU further includes an EHT SIG field contiguous to the U-SIG field,
wherein the EHT-SIG field includes a first control signal transmitted through at least one symbol, and a second control signal in which the first control signal is repeated, and
wherein the second control signal is contiguous to the first control signal.

6. The method of claim 1,
wherein a bandwidth of the PPDU configured based on the first mode has 20 MHz, and a bandwidth of the PPDU configured based on the second mode has 80 MHz, 160 MHz, or 320 MHz.

7. The method of claim 1,
wherein the PPDU is used for single user (SU) communication,
wherein a data field of the PPDU configured based on the first mode supports a single resource unit (RU) and a multiple RU (MRU),
wherein a data field of the PPDU configured based on the second mode supports only a single RU.

8. The method of claim 1,
wherein the third and fourth symbols are configured based on BPSK.

9. A method in a wireless local area network (WLAN) system, the method comprising:
configuring, by a transmitting station (STA), a physical protocol data unit (PPDU),
wherein the PPDU includes a legacy signal (L-SIG) field, a repeated L-SIG (RL-SIG) field which is a repeat of the L-SIG field, and a Universal Signal (U-SIG) field contiguous to the RL-SIG field,
wherein the PPDU is an extremely high throughput (EHT) PPDU,
wherein the L-SIG field includes a length field which is set to a value satisfying a condition that a remainder is zero when the length field is divided by three,
wherein the U-SIG field is transmitted through first through fourth symbols,
wherein the first symbol includes a physical version identifier having a length of three bits,
wherein the physical version identifier is set to zero to identify the EHT PPDU,
wherein the second symbol includes information in which bit information of the first symbol is repeated,
wherein the fourth symbol includes information in which bit information of the third symbol is repeated,
wherein the PPDU is configured based on one of a plurality of transmission modes including a first mode related to an Extended Range (ER) preamble and a second mode related to duplicate transmission,
wherein a constellation mapping pattern of the first and second symbols is determined based on a transmission mode of the PPDU, and
wherein the constellation mapping pattern for the first mode has a first mapping pattern, and the constellation mapping pattern for the second mode has a second mapping pattern;
transmitting, by the transmitting STA, the PPDU to a receiving STA.

10. A receiving station (STA) in a wireless local area network (WLAN) system, the receiving STA comprises,
a transceiver for transmitting and receiving radio signals; and
a processor being operably coupled to the transceiver,
wherein the processor is configured to:
control the transceiver to receive a physical protocol data unit (PPDU),
wherein the PPDU includes a legacy signal (L-SIG) field, a repeated L-SIG (RL-SIG) field which is a repeat of the L-SIG field, and a Universal Signal (U-SIG) field contiguous to the RL-SIG field,
wherein the PPDU is an extremely high throughput (EHT) PPDU,
wherein the L-SIG field includes a length field which is set to a value satisfying a condition that a remainder is zero when the length field is divided by three,
wherein the U-SIG field is received through first through fourth symbols,
wherein the first symbol includes a physical version identifier having a length of three bits,
wherein the physical version identifier is set to zero to identify the EHT PPDU,
wherein the second symbol includes information in which bit information of the first symbol is repeated,
wherein the fourth symbol includes information in which bit information of the third symbol is repeated, and
wherein the PPDU is configured based on one of a plurality of transmission modes including a first mode related to an Extended Range (ER) preamble and a second mode related to duplicate transmission; and
determine a transmission mode of the PPDU based on a constellation mapping pattern of the first and second symbols,
wherein the constellation mapping pattern for the first mode has a first mapping pattern, and
wherein the constellation mapping pattern for the second mode has a second mapping pattern.

11. The receiving STA of claim 10,
wherein a data field of the PPDU configured based on the second mode is duplicated in frequency.

12. The receiving STA of claim 10,
wherein a first symbol based on the first mapping pattern is configured based on binary phase shift keying (BPSK) and a second symbol based on the first mapping pattern is configured based on quadrature BPSK (QBPSK), and
wherein a first symbol based on the second mapping pattern is configured based on QBPSK, and a second symbol based on the second mapping pattern is configured based on BPSK.

13. The receiving STA of claim 10,
wherein a first symbol based on the first mapping pattern is configured based on BPSK, and a second symbol based on the first mapping pattern is configured based on QBPSK, and
wherein a first symbol based on the second mapping pattern is configured based on QBPSK, and a second symbol based on the second mapping pattern is configured based on QBPSK.

14. The receiving STA of claim 10,
wherein the PPDU further includes an EHT SIG field contiguous to the U-SIG field,
wherein the EHT-SIG field includes a first control signal transmitted through at least one symbol, and a second control signal in which the first control signal is repeated, and
wherein the second control signal is contiguous to the first control signal.

15. The receiving STA of claim 10,
wherein a bandwidth of the PPDU configured based on the first mode has 20 MHz, and a bandwidth of the PPDU configured based on the second mode has 80 MHz, 160 MHz, or 320 MHz.

16. The receiving STA of claim 10,
wherein the PPDU is used for single user (SU) communication,
wherein a data field of the PPDU configured based on the first mode supports a single resource unit (RU) and a multiple RU (MRU),
wherein a data field of the PPDU configured based on the second mode supports only a single RU.

17. The receiving STA of claim 10,
wherein the third and fourth symbols are configured based on BPSK.

* * * * *